United States Patent
Nagano

(10) Patent No.: US 10,131,278 B2
(45) Date of Patent: Nov. 20, 2018

(54) IMAGING LENS, CAMERA, VEHICLE-MOUNTED CAMERA, SENSING DEVICE, AND VEHICLE-MOUNTED SENSING DEVICE

(71) Applicant: Takuya Nagano, Kanagawa (JP)

(72) Inventor: Takuya Nagano, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 15/665,895

(22) Filed: Aug. 1, 2017

(65) Prior Publication Data
US 2018/0056869 A1 Mar. 1, 2018

(30) Foreign Application Priority Data

Aug. 24, 2016 (JP) ................... 2016-163521

(51) Int. Cl.
| | |
|---|---|
| *G02B 13/18* | (2006.01) |
| *G02B 9/62* | (2006.01) |
| *B60R 1/00* | (2006.01) |
| *G02B 13/00* | (2006.01) |
| *H04N 5/374* | (2011.01) |

(52) U.S. Cl.
CPC ................. *B60R 1/00* (2013.01); *G02B 9/62* (2013.01); *G02B 13/0045* (2013.01); *H04N 5/374* (2013.01); *B60R 2300/10* (2013.01); *B60R 2300/30* (2013.01)

(58) Field of Classification Search
CPC . G02B 9/00; G02B 9/62; G02B 13/00; G02B 13/001; G02B 13/0015; G02B 13/002; G02B 13/0045
See application file for complete search history.

(56) References Cited

U.S. PATENT DOCUMENTS

| | | | |
|---|---|---|---|
| 2011/0157722 A1* | 6/2011 | Luo .................. | G02B 13/04 359/713 |
| 2013/0050846 A1* | 2/2013 | Huang ............... | G02B 13/0045 359/713 |
| 2016/0033746 A1* | 2/2016 | Chen .................. | G02B 13/0045 359/713 |
| 2016/0202444 A1 | 7/2016 | Nagano | |
| 2016/0291292 A1* | 10/2016 | Lin .................... | G02B 13/0045 |
| 2017/0026537 A1 | 1/2017 | Nagano | |

FOREIGN PATENT DOCUMENTS

| | | |
|---|---|---|
| JP | 2012-220741 | 11/2012 |
| JP | 2016-031531 | 3/2016 |

* cited by examiner

*Primary Examiner* — Thong Nguyen
(74) *Attorney, Agent, or Firm* — Oblon, McClelland, Maier & Neustadt, L.L.P.

(57) ABSTRACT

An imaging lens includes a first lens group having a negative refractive power, an aperture stop, and a second lens group having a positive refractive power. The first lens group, the aperture stop, and the second lens group are sequentially disposed in a direction from an object side to an image side. The first lens group includes a negative first lens and a negative second lens. The second lens group includes a positive third lens, a positive fourth lens, a negative fifth lens, and a positive sixth lens. Conditional formula (1) below is satisfied:

$$0.16 < DL3/TL < 0.32 \quad (1)$$

where
DL3 is a center thickness of the third lens, and
TL is distance between an object-side surface of the first lens and an image-side surface of the sixth lens along the optical axis.

16 Claims, 10 Drawing Sheets

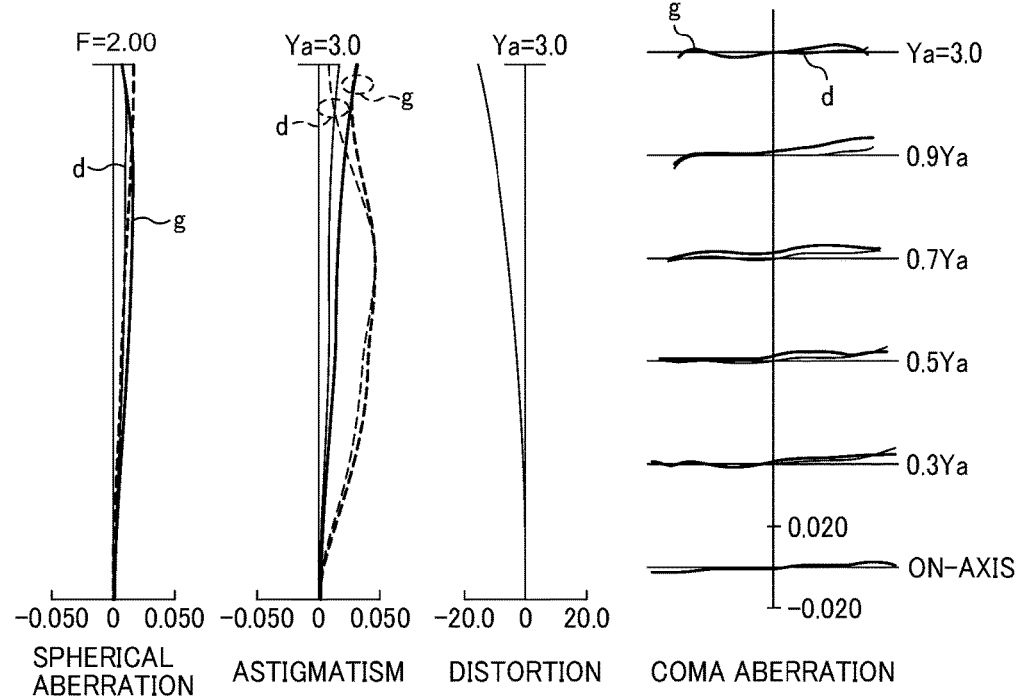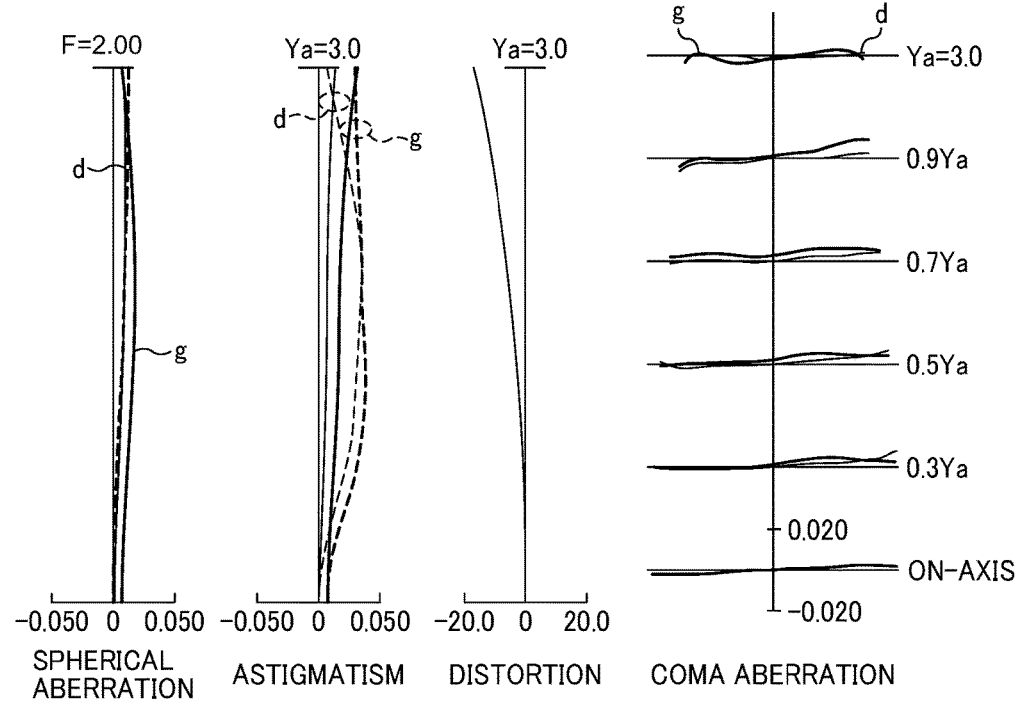

IMAGING LENS, CAMERA, VEHICLE-MOUNTED CAMERA, SENSING DEVICE, AND VEHICLE-MOUNTED SENSING DEVICE

CROSS-REFERENCE TO RELATED APPLICATIONS

This patent application is based on and claims priority pursuant to 35 U.S.C. § 119(a) to Japanese Patent Application No. 2016-163521, filed on Aug. 24, 2016 in the Japan Patent Office, the entire disclosures of which is hereby incorporated by reference herein.

BACKGROUND

Technical Field

Embodiments of the present disclosure relate to an imaging lens, a camera, a vehicle-mounted camera, a sensing device, and a vehicle-mounted sensing device.

Background Art

In recent years, in addition to photographic cameras, such as film cameras and digital cameras, various other types of imaging devices, such as vehicle-mounted cameras, stereo cameras, surveillance cameras, and sensing devices have been commercialized. Imaging lenses to be mounted on such devices are expected to perform better, be more compact, have a wider angle of view to some extent, and a smaller f-stop.

Some imaging devices have an imaging optical system with relatively few lenses, e.g., five to six lenses. Such an imaging optical system has a configuration similar to that of retrofocus lenses used to capture images using a solid-state image sensing device.

SUMMARY

In one aspect of this disclosure, there is provided an improved imaging lens including a first lens group having a negative refractive power, an aperture stop, and a second lens group having a positive refractive power, disposed in that order from an object side to an image side. The first lens group includes a first lens and a second lens, disposed in that order from the object side to the image side. The first lens is a negative lens having a negative meniscus shape with a convex surface facing the object side. The convex surface facing the object side is an object-side surface of the first lens. The second lens is a negative lens having a negative meniscus shape with a convex surface facing the object side. The second lens group includes a third lens that is a positive lens having a convex surface facing the image side, a fourth lens that is a positive lens having a biconvex shape, a fifth lens that is a negative lens having a biconcave shape, and a sixth lens that is a positive lens having an aspherical surface with a concave surface facing the image side near an optical axis and a convex surface facing the image side in a marginal area. The concave surface facing the image side is an image-side surface of the sixth lens. The third lens, the fourth lens, the fifth lens, and the sixth lens are sequentially disposed in that order from the object side to the image side, such that $$0.16 < DL3/TL < 0.32 \quad (1)$$

where DL3 is a center thickness of the third lens, and TL is distance between the object-side surface of the first lens and the image-side surface of the sixth lens along the optical axis.

In another aspect of this disclosure, there is provided an improved camera including the above-described imaging lens. The imaging lens is an image-capturing optical system.

In still another aspect of this disclosure, there is provided an improved vehicle-mounted camera including the above-described imaging lens. The imaging lens is an image-capturing optical system.

In yet another aspect of this disclosure, there is provided an improved sensing device including the above-described imaging lens, an image sensor to photoelectrically convert an image formed by the imaging lens into an electrical signal, an image processing device to convert the electrical signal into image data; and a processing unit to obtain sensing information from the image data.

In a further aspect of this disclosure, there is provided an improved vehicle-mounted sensing device including the above-described imaging lens, an image sensor to photoelectrically convert an image formed by the imaging lens into an electrical signal, an image processing device to convert the electrical signal into image data; and a processing unit to obtain sensing information from the image data.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 8 illustrates aberration diagrams of the imaging lens according to Numerical Example 1;

FIG. 9 illustrates aberration diagrams of the imaging lens according to Numerical Example 2;

Figure 1:
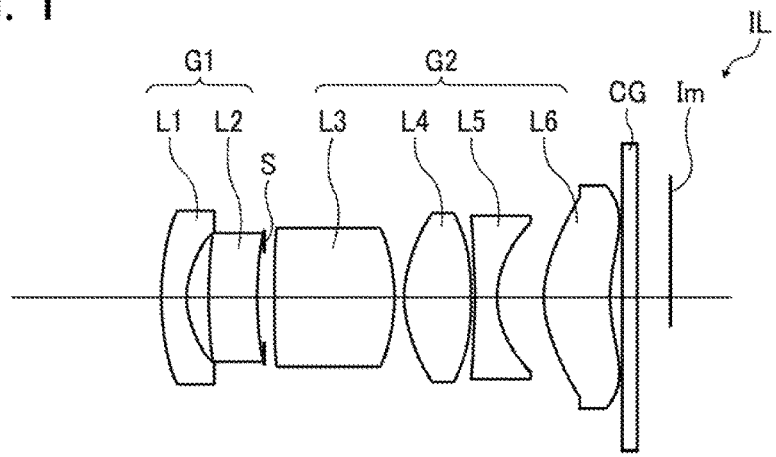
FIG. 1 is a sectional view of a configuration of an imaging lens according to Numerical Example 1.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

A description is given below of the embodiments of the present disclosure.

FIGS. 1 through 7 are illustrations of a first embodiment through a seventh embodiment of an imaging lens IL in the present disclosure. The first embodiment through the seventh embodiment correspond to Numerical Examples 1 through 7 of the imaging lens IL, respectively.

In FIGS. 1 through 7, the left side is an object side, and the right side is an image side.

The same reference signs are given to corresponding elements in FIGS. 1 through 7 to facilitate understanding of the elements.

In each of the first embodiment through the seventh embodiment, an aperture stop S is disposed between a second lens L2 and a third lens L3.

In the first embodiments through the seventh embodiment illustrated in FIGS. 1 through 7, it is assumed that the imaging lens IL forms an image, and a solid-state image sensor images the formed image. As illustrated in each of FIGS. 1 through 7, a transparent cover glass CO is disposed close to the object side of an imaging plane Im of the imaging lens IL, to protect a photo-sensing surface of the solid-state image sensor. The solid-state image sensor is disposed such that the photo-sensing surface of the solid-state image sensor coincides with the imaging plane Im.

FIGS. 1 through 7 represent one transparent parallel plate optically equivalent to the above-described cover glass CO and various types of filters, such as an infrared cut filter.

As illustrated in FIGS. 1 through 7, the imaging lens IL has a six-lens structure including a first lens L1, the second lens L2, the aperture stop S, the third lens L3, a fourth lens L4, a fifth lens L5, and a sixth lens L6, which are sequentially disposed in a direction from the object side to the image side.

The first lens L1 has a negative meniscus shape with a convex surface facing the object side, having negative refractive power.

The second lens L2 has a negative meniscus shape with a convex surface facing the object side, having negative refractive power.

The first lens L1 and the second lens L2, which are disposed on the object side of the aperture stop S, constitute a first lens group G1. The first lens group G1 has negative refractive power.

The third lens L3 has a convex surface facing the image side, having positive refractive power.

The fourth lens L4 has a biconvex shape having positive refractive power.

The fifth lens L5 has a biconcave shape having negative refractive power.

The sixth lens L6 has an aspherical shape, in which a concave surface faces the image side near the optical axis and a convex surface faces the image side in the marginal area, having positive refractive power. Note that "the marginal area" refers to an area away from the optical axis within the optical system.

The third lens L3, the fourth lens L4, the fifth lens L5, and the sixth lens L6 are disposed on the image side of the aperture stop S, constituting a second lens group G2. The second lens group G2 has positive refractive power.

The imaging lens IL of the present disclosure having the above-described configuration satisfies conditional formula (1) below:

$$0.16 < DL3/TL < 0.32 \qquad (1).$$

In the parameter "DL3/TL" of conditional formula (1), DL3 is a center thickness of the third lens L3, i.e., distance between the lens surfaces of the third lens L3 along the optical axis, and TL is distance between an object-side surface of the first lens L1 and an image-side surface of the sixth lens L6 along the optical axis. Hereinafter, the distance TL between the object-side surface of the first lens L1 and the image-side surface of the sixth lens L6 along the optical axis is referred to as the thickness of a lens system of the imaging lens IL.

As described above, the imaging lens IL includes the first lens group G1 having negative refractive power, the aperture stop S, and the second lens group G2 having positive refractive power, which are sequentially disposed in that order from the object side to the image side.

The first lens group G1 includes the first lens L1 and the second lens L2, which are sequentially disposed in that order from the object side to the image side. The first lens L1 has a negative meniscus shape with the convex surface facing the object side, having the negative refractive power. The second lens L2 has a negative meniscus shape with the convex surface facing the object side, having the negative refractive power. The second lens group G2 includes the third lens L3, the fourth lens L4, the fifth lens L5, and the sixth lens L6, which are sequentially disposed in that order from the object side to the image side. The third lens L3 has the convex surface facing the image side, having the positive refractive power. The fourth lens has the biconvex shape, having the positive refractive power. The fifth lens has the biconcave shape, having the negative refractive power. The sixth lens has an aspherical shape with the concave surface facing the image side near the optical axis and the convex surface facing the image side in the marginal area. In such a configuration, DL3 and TL satisfy conditional formula (1) where DL3 is a center thickness of the third lens L3, and TL is distance between the object-side surface of the first lens L and the image-side surface of the sixth lens L6 along the optical axis.

The imaging lens IL is a retrofocus lens, i.e., a retrofocus imaging lens, in which the first lens group G1 having the negative refractive power and the second lens group G2 having the positive refractive power are disposed.

In such a retrofocus imaging lens, an exit pupil is away from the imaging plane Im, so that angles at which image-forming rays enter the imaging plane Im can be reduced.

In a meridional plane, an off-axis diffraction image expands in proportion to "(cos θ)−3" where θ is the angle (incident angle) at which light rays enter the imaging plane Im, relative to expansion of the diffraction image on the optical axis. Accordingly, as the incident angle θ increases, the diffraction image expands, resulting in a decrease in image resolution.

Thus, the angles at which the image-forming rays strike an area ranging from the center to the peripheral area of the imaging plane Im are preferably reduced to obtain a successful resolution in a range up to a high spatial frequency area.

In the present embodiments, in which the imaging lens IL forms an image and the solid-state image sensor images the formed image, as the image-forming rays enter more peripheral areas in the imaging plane Im (that is, the image height in the imaging plane Im increases), the angles at which the image-forming rays strike the imaging plane Im increase. Such an increase in incident angle reduces the amount of light to be imaged by the solid-state image sensor, resulting in a decrease in modulation transfer function (MTF). Hence, the incident angles of the image-forming rays on a range including the peripheral area of the imaging plane Im, i.e., the photo-sensing surface of the solid-state image sensor, are preferably reduced.

The imaging lens IL according to the embodiments of the present disclosure is a retrofocus lens, which increases the distance from the exit pupil to the imaging plane Im, and further reduces the angles at which the image-forming rays strike a range including the peripheral area in the imaging plane Im. Such a reduction in incident angle reduces or prevents a decrease in amount of light in the peripheral area of an image, thereby enhancing the oretical limit value of the MTF in peripheral area of the imaging plane Im, thus achieving a successful image-forming performance.

With the configuration in which the first lens L1 having the negative refractive power and the second lens L2 having the negative refractive power constitute the first lens group G1, the first lens group G1 increases the capability of correcting aberration. Accordingly, the first lens group G1 corrects aberration including chromatic aberration to a level of aberration that can be corrected by the second lens group G2.

With the configuration in which the first lens group G1 has a two-lens structure having negative refractive power, the off-axis rays traveling toward the image side gently bend while passing through the two lenses of the first lens group G1, which allows successful correction of the off-axis aberration.

The aperture stop S is disposed relatively close to the object side, i.e., between the second lens L2 and the third lens L3. This configuration obtains an appropriate distance between the exit pupil and the imaging plane Im, thereby preventing an increase in incident angles of the off-axis rays on the imaging plane Im. Such a configuration enhances the limit value of the image-forming performance. Further, such a configuration prevents a reduction in amount of light that enters a microlens of a solid-state image sensor when the solid-state image sensor is used to image an image.

In the second lens group G2, the third lens L3 and the fourth lens L4 have positive refractive power. The fifth lens L5 has negative refractive power, and the sixth lens L6 has positive refractive power. That is, the second lens group G2 has a triplet refractive power arrangement in which "positive, negative, and positive" refractive power are sequentially arranged.

Such a triplet refractive power arrangement, in which the three refractive power is arranged in order of positive, negative and positive within the second lens group G2, to facilitate correcting aberration allows successful correction of various types of aberrations, such as chromatic aberration.

The sixth lens L6 has a concave surface facing the image side near the optical axis, having a convex surface facing the image side in the peripheral area away from the optical axis. Such a configuration reduces the incident angles of the off-axis rays on the imaging plane Im, and thereby allows successfully correcting curvature of field in areas ranging to the most peripheral area in the imaging plane Im.

Conditional formula (1) defines an appropriate range of the ratio of DL3 to TL where TL is the thickness of the lens system of the imaging lens IL, and DL3 is the center thickness of the third lens L3.

When the value of DL3/TL exceeds the upper limit defined by conditional formula (1), the thickness ratio of the third lens L3 alone to the entire system is greater than or equal to 32%, which increases restriction in the shapes (thicknesses or surface curvatures) of other five lenses other than the third lens L3. Accordingly, the entire lens system has difficulties in correcting aberration.

As the value of DL3/TL in conditional formula (1) decreases, the third lens L3 decreases in thickness. The imaging lens IL according to the embodiments of present disclosure can achieve a higher image-forming performance with an increase in height of light rays. However, when the value of DL3/TL falls below the lower limit defined by conditional formula (1), the thickness of the third lens L3 becomes insufficient, which causes the marginal rays having a great height to steeply bend while passing through the third lens L3. This hampers correcting aberration, particularly the off-axis aberration, successfully in the imaging lens IL, and thus the imaging lens IL is more likely to degrade the image-forming performance due to manufacturing errors.

The embodiments of the present disclosure provide a compact imaging lens having a wide angle of view of approximately 68 degrees and a large diameter with an F number of approximately 2, as described in the following Numerical Examples. Further, the imaging lens IL according to the embodiments of the present disclosure has various aberration corrected in a range up to the most-peripheral areas, having a high image-forming performance in a range from a low frequency area to a high frequency area.

Preferably, the imagine lens IL according to the present embodiments, which satisfies the above-described configuration, satisfies any one or more of conditional formulas (2) through (6) below:

$$0.45 < fL3-L4/f < 0.80 \tag{2},$$

$$0.04 < DL5-L6/TL < 0.15 \tag{3},$$

$$-1.20 < fL5/f < -0.55 \tag{4},$$

$$38 < v2G < 55 \tag{5, and}$$

$$-2.70 < fL1/f < -1.50 \tag{6}$$

where f is focal length of the entire system of the imaging lens IL;

fL3–L4 is combined focal length of the third lens L3 and the fourth lens L4 in the second lens group G2; TL is the thickness of the lens system of the imaging lens IL as described above;

DL5–L6 is distance between the image-side surface of the fifth lens L5 and the object-side surface of the sixth lens L6 along the optical axis, fL5 is focal length of the fifth lens L5;

ν2G is an averaged value of Abbe numbers of materials of the third lens L3, the fourth lens L4, the fifth lens L5, and the sixth lens L6 in the second lens group G2; and fL1 is focal length of the first lens L1.

Conditional formula (2) defines an appropriate range of the ratio of the combined focal length of the positive lens L3 and the positive lens L4 in the second lens group G2 to the focal length of the entire system.

As described above, the second lens group G2 has the triplet refractive power arrangement. The combined focal length of the third lens L3 and the fourth lens L4 restricts the positive refractive power on the object side that is one of the three refractive power (positive, negative, and positive) arranged within the second lens group G2.

When the value of fL3–L4/f exceeds the upper limit defined by conditional formula (2), the positive refractive power is more likely to be insufficient in the entire system of the imaging lens IL. To handle such a circumstance, the positive refractive power on the image side within the second lens group G2, i.e., the positive refractive power of the sixth lens L6 is preferably increased. This causes the aberration correction to be imbalanced. Particularly, aberrations, such as coma aberration, axial chromatic aberration, lateral chromatic aberration, curvature of field, and distortion, are more likely to be difficult to correct.

When the value of fL3–L4/f falls below the lower limit defined by conditional formula (2), the balance in aberration correction between the first lens group G1 and "the third lens L3 and the fourth lens L4" is difficult to achieve, which hampers successful correction of aberrations. In addition, the imaging lens IL is more likely to degrade the performance due to manufacturing errors.

Conditional formula (3) defines an appropriate range of the ratio of the distance between the image-side surface of the fifth lens L5 and the object-side surface of the sixth lens L6, to the thickness of the lens system.

When the value of DL5–L6/TL exceeds the upper limit defined by conditional receptive to (3), the ratio of the distance between the fifth lens L5 and the sixth lens L6 to the thickness of the lens system exceeds 15%, which restricts the thickness of each lens (the first lens L through the sixth lens L6) and the distance between lenses. This hampers successful correction of aberrations. When the value of DL5–L6/TL falls below the lower limit defined by conditional formula (3), the distance between the fifth lens L5 and the sixth lens L6 is excessively reduced. Accordingly, the off-axis rays are more likely to steeply bend between the fifth lens L5 having negative refractive power and the sixth lens L6 having positive refractive power. This increases the difficulties in correcting the off-axis aberration, particularly coma aberration. When the value of DL5–L6/TL falls below the lower limit defined by conditional formula (3), the height at which the off-axial rays enter the object-side surface of the sixth lens L6 becomes insufficient, which hampers reducing the angles at which the light rays enter the imaging plane Im.

Conditional formula (4) defines an appropriate range of the ratio of the focal length of the fifth lens L5 to the focal length of the entire system.

When the value of fL5/f exceeds the upper limit defined by conditional formula (4), the negative focal length of the fifth lens L5 becomes short, which excessively increases the negative refractive power of the fifth lens L5. This further causes the excessively imbalanced aberration correction between the positive refractive power of the third lens L3, the fourth lens L4, and the sixth lens L6 and the negative refractive power of the fifth lens L5 within the second lens group G2. Thus, the imaging lens IL is more likely to degrade the performance due to manufacturing errors.

When the value of fL5/f falls below the lower limit defined by conditional formula (4), the negative focal length of the fifth lens L5 is excessively increased and the negative refractive power of the fifth lens L5 is excessively reduced, so that the negative refractive power within the second lens group G2 of the triplet refractive power arrangement is insufficient. This leads to a poor balance between the refractive powers arranged within the second lens group G2 (the refractive power in the triplet refractive power arrangement is imbalanced). Thus, correcting aberrations successfully is more likely to be difficult.

Conditional formula (5) defines an appropriate range of the Abbe number of material of each of the third lens L3, the fourth lens L4, the fifth lens L5, and the sixth lens L6 that constitute the second lens group G2.

When the value of ν2G falls below the lower limit defined by conditional formula (5), the degree of correction of chromatic aberration is more likely to be insufficient. When the value of ν2G exceeds the upper limit defined by conditional formula (5), chromatic aberration is excessively corrected, so that the balance in aberration correction between the first lens group G1 and the second lens group G2 is easily disturbed, thus failing to provide a successful image-forming performance.

When the lenses constituting the second lens group G2 are made of material that satisfies conditional formula (5), the off-axial chromatic aberration and longitudinal chromatic aberration that occur in the first lens group G1 on the object side of the aperture stop S are easily corrected successfully.

Conditional formula (6) defines an appropriate range of the ratio of the focal length of the first lens L1 having negative refractive power, to the focal length of the entire system.

When the value of fL1/f exceeds the upper limit defined by conditional formula (6), the negative refractive power of the first lens L1 excessively increases relative to the positive refractive power of the entire system. This leads to an increase in distortion and astigmatism, thus tempering correcting aberrations over the entirety of the imaging lens IL.

When the value of fL1/f falls below the lower limit defined by conditional formula (6), the negative refractive power of the first lens L1 becomes insufficient, and the balance in aberration correction over the entirety of the imaging lens IL is more likely to be disturbed. Thus, correcting aberrations successfully tends to be difficult. Further, when the value of fL1/f falls below the lower limit defined by conditional formula (6), the first lens L1 easily increases in diameter, which tempers downsizing the imaging lens IL.

In the above-described conditional formulas (2) through (6), when at least one of conditional formulas (2) and (4) is satisfied, any type of aberration can be easily corrected successfully.

When at least one of conditional formulas (3) and (6) is satisfied, the off-axis aberration can be easily corrected successfully.

When conditional formula (5) is satisfied, the chromatic aberration can be easily corrected successfully.

When any of conditional formulas (2) through (6) is satisfied, the advantageous effects thereof for aberration correction corresponding to the satisfied conditional formula are exhibited.

With an increase in number of conditional formulas to be satisfied among conditional formulas (2) through (6), aberrations can be more easily corrected successfully. Most preferably, all of conditional formulas (2) through (6) are satisfied.

As described above, the sixth lens L6 of the imaging lens IL according to the present disclosure has an aspherical surface in which a concave surface faces the image side near the optical axis and a convex surface faces the image side in the marginal area away from the optical axis. In the present disclosure, other lens other than the sixth lens L6 may also have such an aspherical surface. Such a configuration can easily increase the performance of the imaging lens IL.

Further, when other lenses other than the sixth lens L6 have an aspherical surface, each of the second lens L2, the fourth lens L4, and the fifth lens L5 preferably has at least one aspherical surface.

Both of the fourth lens L4 and the fifth lens L5 are disposed away from the aperture stop S, so that the axial rays are separated from the off-axial rays in the fourth lens L4 and the fifth lens L5. The aspherical shape can provide an appropriate surface shape for each of the axial rays to enter the area near the optical axis and the off-axial rays to enter the marginal area in each lens. Thus, when the fourth lens L4 and the fifth lens L5 have at least one aspherical surface, a more successful aberration correction can be achieved.

When the second lens L2, which is close to the aperture stop S, has an aspherical surface, aberration, particularly spherical aberration, can be corrected successfully.

Preferably, in terms of material of the six lenses that constitute the imaging lens IL, the first lens L and the third lens L3 are made of glass, and the second lens, L2, the fourth lens L4, the fifth lens L5, and the sixth lens L6 are made of resin.

When the fourth lens L4 (positive lens), the fifth lens L5 (negative lens), and the sixth lens L6 (positive lens) are made of resin, the lenses L4, L5 and L6 can be engaged with each other by shaping the outer diameter shapes of the lenses L4, L5 and L6. Such a configuration of the lenses L4, L5, and L6 can reduce the manufacturing errors, thereby reducing the degradation of performance of the imaging lens IL due to the manufacturing errors. Further, manufacturing resin lenses can facilitate forming aspherical shapes, achieving low cost.

The first lens L1, which is disposed closest to the object side, is susceptible to external mechanical force. Accordingly, the first lens L1 is preferably made of hard glass. As described above, the third lens L3 is made of glass. If the third lens L3 is made of resin, five lenses of the imaging lens IL are resin lenses. The third lens L3 is disposed near the center of the lens system, which means that the third lens L3 is less likely to be influenced by the mechanical force. In view of such a situation, it is conceivable that the third lens L3 is designed to have an aspherical surface to increase the performance of the imaging lens IL.

However, the shape and refractive index of any resin lens are more highly dependent on temperature than those of any glass lens. That is, the imaging lens IL, which is used in a wide range of temperature, is affected more significantly by the temperature change with an increase in the number of resin lenses used in the imaging lens IL. Accordingly, preferably, the first lens L1 and the third lens L3 are made of glass (glass lenses), and the second lens L2, the fourth lens L4, and the sixth lens L6 are made of resin (resin lenses), with which an aspherical surface can be easily formed.

In such a configuration, conditional formula (7) below is preferably satisfied:

$$0.90 < fL3/fL4 < 1.60 \quad (7)$$

where
fL3 is the focal length of the third lens L3, and
fL4 is the focal length of the fourth lens L4.

Note that the values of fL3 and fL4 are values obtained when the operational temperature of the imaging lens IL is, for example, 20° C. in design.

With a change in the operational temperature of the imaging lens IL, each lens thermally expands or changes in refractive index. In addition, a barrel that holds the lenses also thermally expands, which adversely changes the focal length of the imaging lens IL, resulting in shift of the image-forming position. Accordingly, the adverse effects of temperature change are preferably considered when any resin lens is used in the imaging lens IL.

The refractive index temperature coefficient and linear expansion coefficient of lens material greatly differ between glass and resin. The resin lens involves shifting the image-forming position due to changes in temperature.

When conditional formula (7) is satisfied, the combined positive refractive power of the third lens L3 and the fourth lens L4 is prevented from greatly changing due to a change in the refractive power of the fourth lens L4 as a resin lens or the third lens L3 as a glass lens. Further, when conditional formula (7) is satisfied, aberrations can be successfully corrected irrespective of changes in temperature, and good temperature characteristics (good stability of the optical characteristics to changes in temperature) can be provided.

When the barrel is made of commonly-used metal or resin containing glass having a linear expansion coefficient of $1 \cdot 10^{-5}$ to $3 \cdot 10^{-5}$, the advantageous effects of conditional formula (7) is particularly exhibited.

When the third lens L3 and the fourth lens L4 are configured to satisfy conditional formula (7), the ratio of the focal length fL3 of the third lens L3 to the focal length f of the entire system of the imaging lens IL preferably satisfies conditional formula (8) below:

$$1.05 < fL3/f < 1.60 \quad (8).$$

When the value of fL3/f exceeds the upper limit defined by conditional formula (8), the positive refractive power of the second lens group G2 is more likely to be insufficient, which hampers a good balance in aberration correction between the first lens group G1 and the second lens group G2. Accordingly, correcting aberrations, particularly spherical aberration and chromatic aberration, successfully is difficult.

When the value of fL3/f falls below the lower limit defined by conditional formula (8), the good balance in aberration correction between the first lens group G1 and the second lens group G2 is extremely difficult to achieve. Thus, the imaging lens IL is more likely to degrade the performance due to manufacturing errors.

When conditional formulas (7) and (8) are satisfied, more successful correction aberration is achieved, and thus an imaging lens that is tolerant to changes in temperature, having a higher performance can be provided.

More preferably, the imaging lens IL according to the present disclosure satisfies conditional formula (9) below to maintain a higher image-forming performance irrespective of changes in operational temperature of the imaging lens IL:

$$1.70 < fL4\text{-}L5\text{-}L6/f < 3.10 \quad (9)$$

where fL4–L5–L6 denotes combined focal length of the resin lenses in the second lens group G2, i.e., the fourth lens L4, the fifth lens L5, and the sixth lens L6.

Note that the values of fL4–L5–L6 are values obtained from the focal lengths of the fourth lens L4, the fifth lens L5, and the sixth lens L6 when the operational temperature of the imaging lens IL is, for example, 20° C. in design.

As described above, the second lens group G2 has the triplet refractive power arrangement, in which positive, negative, and positive refractive powers are sequentially arranged. More specifically, the third lens L3 and the fourth lens L4 have positive refractive power. The fifth lens L5 has negative refractive power. The sixth lens L6 has positive refractive power.

When the value of fL4–L5–L6 exceeds the upper limit defined by conditional formula (9), the combined refractive power of the fourth lens L4 through the sixth lens L6 is excessively reduced. Accordingly, the second lens group G2 lacks in capability of correcting aberrations that is so-called triplet aberration correction capability.

With a decrease in fL4–L5–L6, the combined refractive power of the fourth lens L4 through the sixth lens L6 increases. However, the lenses L4, L5, and L6 adversely change in shape and refractive index with changes in temperature because these lenses L4, L5, and L6 are resin.

When the value of fL4–L5–L6/f falls below the lower limit defined by conditional formula (9), the variations in the combined refractive power of the fourth lens L4 through the sixth lens L6 due to changes in temperature excessively increase. This hampers correcting a shift in image-forming position due to changes in temperature.

In the present embodiments, the first lens L1 and the third lens L3 are made of glass, and the other lenses L2, L4, L5, and L6 are made of resin. In such a case, the imaging lens IL according to the present embodiments preferably satisfies conditional formula (10) below:

$$0 < dnP/dt(P)\text{-}dnN/dt(N) < 8.0 \quad (10)$$

where dnP/dt (P) denotes a refractive index temperature coefficient (×10$^6$/° C.) of material of the third lens L3 within the range of 40° C. through 60° C., and dnN/dt (N) denotes a refractive index temperature coefficient (×10$^6$/° C.) of material of the first lens L1 within the range of 40° C. through 60° C.

In conditional formula (10), "nP" is a refractive index of material of the third lens L3 that is a positive lens, and "nN" is a refractive index of material of the first lens L1 that is a negative lens. Further, "t" denotes a temperature within the range of 40° C. through 60° C.

Accordingly, "dnP/dt" denotes a refractive index temperature coefficient of the third lens L3 within the range of 40° C. through 60° C. Since the refractive index temperature coefficient of glass typically falls within the range of approximately −10.0*10$^{-6}$ through 11.0*10$^{-6}$, the refractive index temperature coefficient of the third lens L3 (glass) is multiplied by 10' to define "dnP/dt(P)" for simplicity.

Similarly, "dnN/dt" denotes the refractive index temperature coefficient of the first lens L1 (glass) within the range of 40° C. through 60° C., and the refractive index temperature coefficient of the first lens L1 is multiplied by 10$^6$ to define "dnN/dt(N)" for simplicity.

When the value of dnP/dt (P)–dnN/dt (N) exceeds the upper limit defined by conditional formula (10), the positive refractive power excessively increases with an increase in temperature. This moves the image-forming position toward the object side of the imaging plane Im. When the value of dnP/dt (P)–dnN/dt (N) falls below the lower limit defined by conditional formula (10), the positive refractive power excessively decreases with an increase in temperature. This moves the image-forming position toward the image side of the imaging plane Im.

With the value of dnP/dt (P)–dnN/dt (N) within the range defined by conditional formula (10), the shift of the image-forming position can be more effectively controlled.

Note that conditional formulas (7) through (10) are preferably satisfied assuming that the first lens L1 and the third lens L3 are glass lenses and the second lens L2, the fourth lens L4, the fifth lens L5, and the sixth lens L6 are resin lenses.

Preferably, any one or more of the conditional formulas (7) and (8) through (10) are satisfied in the present embodiments.

In the present embodiments, conditional formulas (7) through (10) are satisfied assuming that the first lens L1 and the third lens L3 are glass lenses and the second lens L2, the fourth lens L4, the fifth lens L5, and the sixth lens L6 are resin lenses. In addition, any one or more of conditional formula (1) and conditional formulas (2) through (6) are preferably satisfied. The advantageous effects thereof are exhibited according to any satisfied conditional formula.

Hereinafter, a description is given of the embodiments of a camera, a vehicle-mounted camera, and a vehicle-mounted sensing device.

Figure 15A:
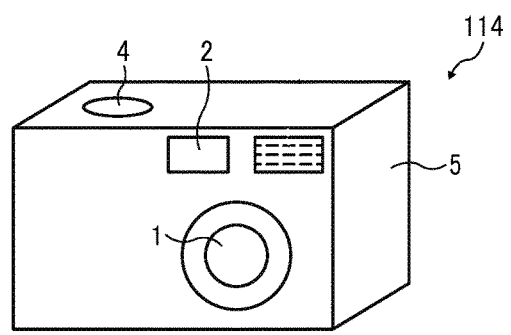
FIGS. 15A and 15B are illustrations of a camera according to a first embodiment.

FIG. 15A is a front view of a camera 114 according to an embodiment of the present disclosure. 15B is a back view of the camera 114. FIG. 16 is an illustration of a system configuration of the camera 114 in FIGS. 15A and 15B.

Figure 15B:
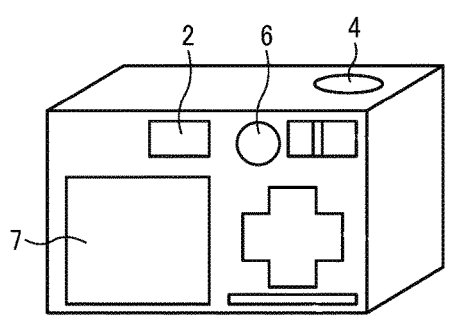
Figure 16:
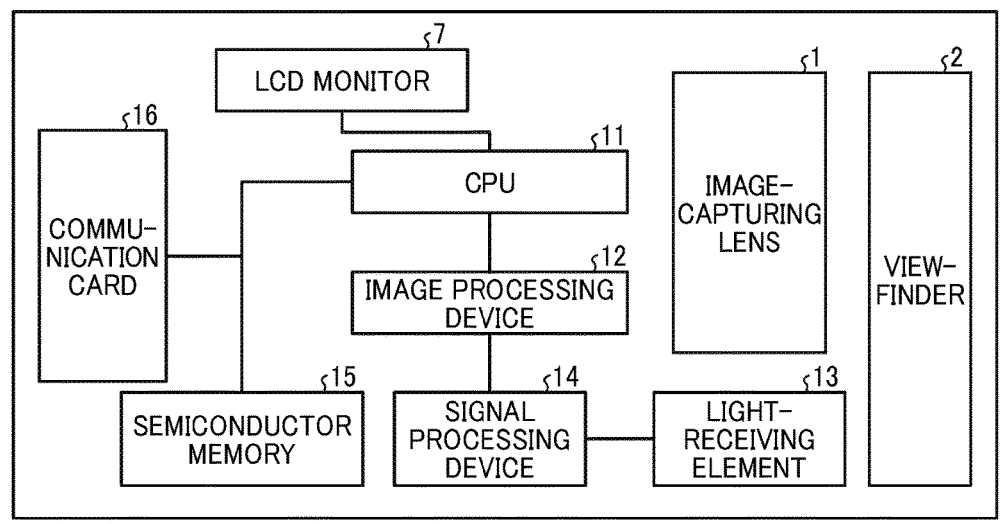
FIG. 16 is an illustration of a system configuration of the camera in FIGS. 15A and 15B.

As illustrated in FIG. 16, the camera 114 of FIGS. 15A and 15B has a system configuration that includes an image-capturing lens 1 as the imaging lens IL and a light-receiving element 13 as the solid-state image sensor. The image-capturing lens 1 forms an image, and the light-receiving element 13 images the formed image.

The camera 114 further includes a central processing unit (CPU) 11, an image processing device 12, a viewfinder 2, a power switch 6, a liquid crystal display (LCD) monitor 7, a signal processing device 14, a semiconductor memory 15, and a communication card 16. The CPU 11 controls the signal processing device 14 to process the output of the light-receiving element 13 to generate digital information (convert the output of the light-receiving element 13 into digital information).

The digital information of images is displayed on the LCD monitor 7, and stored in the semiconductor memory 15 or used for the external communication via the communication card 16. In some embodiments, the camera 114 may be configured not to include a communication function unit.

The imaging lens IL according to any of Numerical Examples 1 through 7 may be used as the image-capturing lens.

The liquid crystal monitor 7 is capable of displaying an image that is being captured as well as an image that is recorded in the semiconductor memory 15.

As illustrated in FIG. 15A, the image-capturing lens 1 as an imaging optical system is disposed on the front side of the camera 114. In FIG. 15A, the image-capturing lens 1 is retracted inside the camera 114 in a portable manner. When the power switch 6 of FIG. 15B is turned on, a lens barrel is ejected from a housing 5 of the camera 114. The ejected image-capturing lens 1 is focused at infinity.

In the camera 114 of FIGS. 15A and 15B, when a shutter button 4 is half pressed with the camera 114 facing an object to be captured, the image-capturing lens 1 starts focusing on the object. When the shutter button 4 is fully pressed, the camera 114 captures an image. Subsequently, the above-described process is performed.

When an image recorded in the semiconductor memory 15 is displayed on the LCD monitor 7 or transmitted to another device by using the communication card 16, an operation key 8 is operated. The semiconductor memory 15 and the communication card 16 are inserted into a dedicated or general-purpose slot 9 when used.

As illustrated in FIG. 15A, when the image-capturing lens 1 is retracted inside the camera 114, the lens group G1 and the second lens G2 of the image-capturing lens 1 may not be in line with the optical axis. For example, the second lens group G2 shifts away from the optical axis and is stored in parallel with the first lens group G1, which allows slimming down the imaging device such as the camera 114.

In the imaging lens IL according to Numerical Examples 1 through 7, the second lens group G2 is thicker than the first lens group G1. Accordingly, shifting the second lens group G2 away from the optical axis more significantly contributes to the slimming down of the imaging device such as camera 114 than the first lens group G1 does.

Figure 17A:
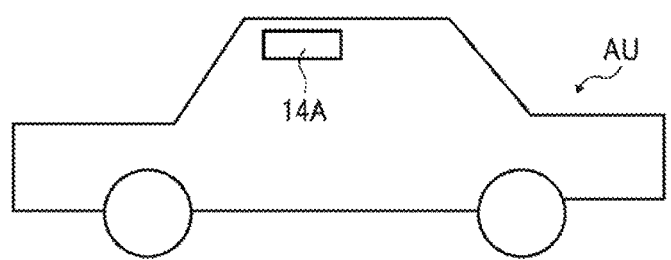
FIG. 17A is a schematic view of a vehicle-mounted camera according to the first embodiment.

FIG. 17A is a schematic view of a vehicle-mounted camera 14A according to the first embodiment.

As illustrated in FIG. 17A, the vehicle-mounted camera 14A is mounted on a vehicle AU to obtain image information outside the vehicle AU.

Figure 17B:
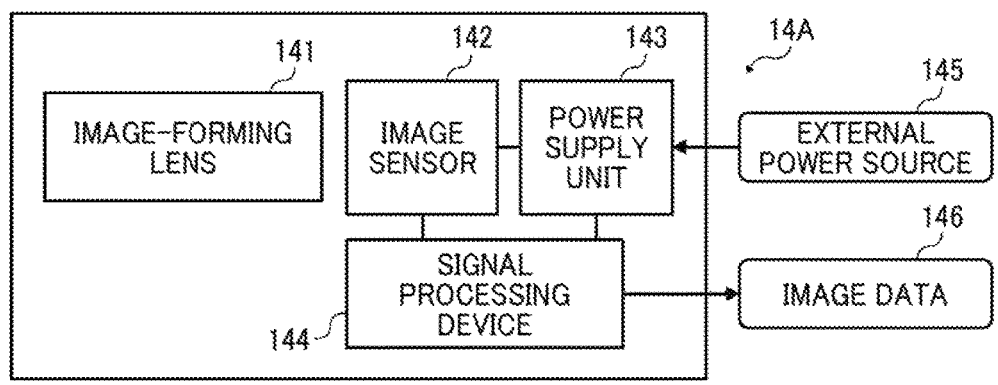
FIG. 17B is a system chart of the vehicle-mounted camera of FIG. 17A.

FIG. 17B is a system chart of the vehicle-mounted camera 14A.

In FIG. 17B, an image-forming lens 141 is an imaging lens as an image-capturing optical system. The imaging lens IL according to any of Numerical Examples 1 through 7 to be described below may be used as the image-forming lens 141.

The image-forming lens 141 forms an optical image of a subject, and an image sensor 142 photoelectrically coverts the optical image into an electrical signal. Subsequently, a signal processing device 144 converts the electrical signal into image data 146, and outputs the image data 146 to an outside of the vehicle-mounted camera 14A.

An external power source 145 supplies power to a power supply unit 143, the image sensor 142, and the signal processing device 144 to operate the system of the vehicle-mounted camera 14A.

The image data 146 is displayed for a driver, using a device such as a back monitor. Alternatively, the image data 146 is recorded in, e.g., a drive recorder.

Figure 18:
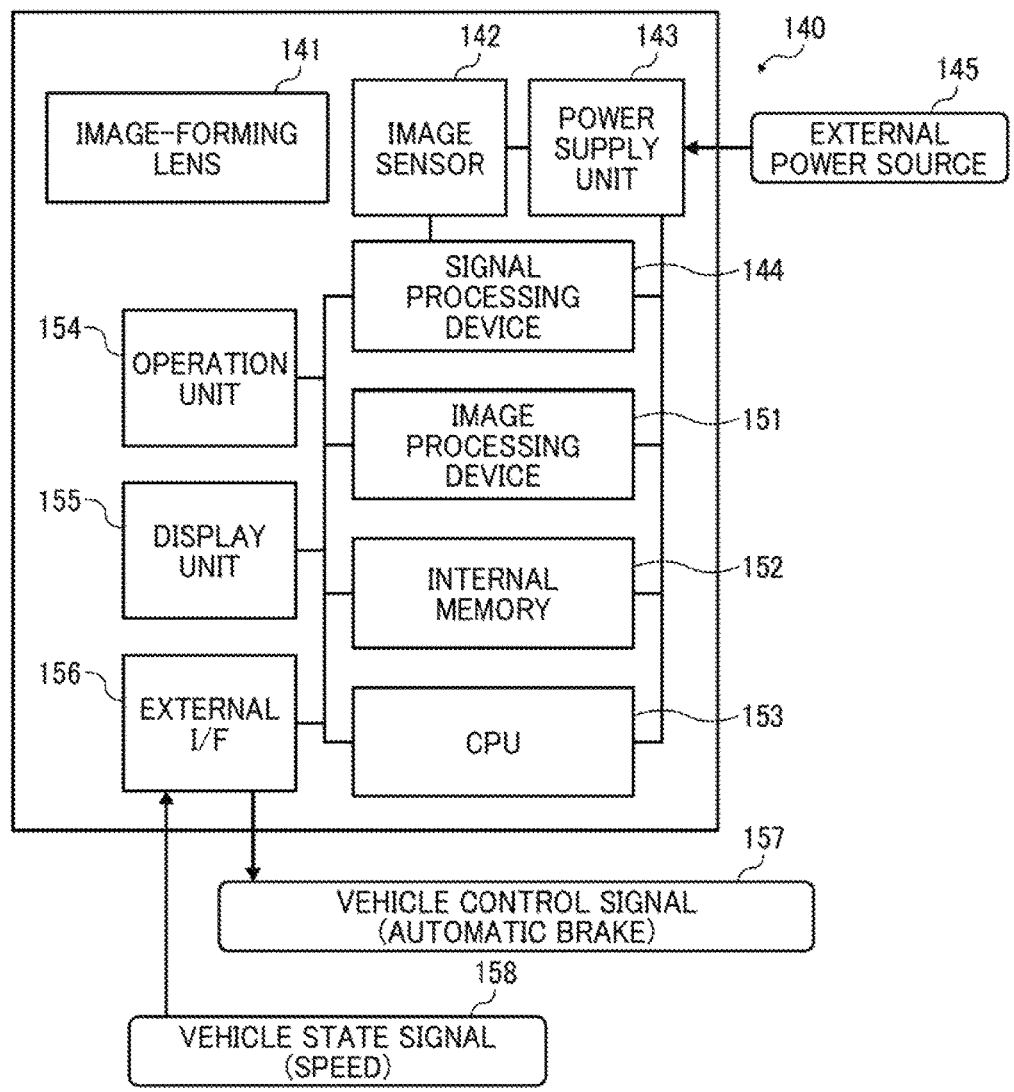
FIG. 18 is an illustration of a vehicle-mounted sensing device according to the first embodiment.

FIG. 18 is a system chart of a vehicle-mounted sensing device 140 according to the first embodiment of the present disclosure. The vehicle-mounted sensing device 140 according to the present embodiment employs the vehicle-mounted camera 14A in FIGS. 17A and 17B. The same reference signs as in FIGS. 17A and 17B are given to corresponding elements in FIG. 18 to facilitate understanding of elements.

The image-forming lens 141 in FIG. 18 is the same as the image-forming lens 141 of the vehicle-mounted camera 14A in FIGS. 17A and 17B, and the imaging lens IL according to any of Numerical Examples 1 through 7 may be used as the image-forming lens 141. The image-forming lens 141 forms an optical image of a subject, and the image sensor 142 photoelectrically converts the optical image into an electrical signal. Subsequently, the signal processing device 144 converts the electrical signal into image data, thus generating the image data. An image processing device 151 performs any image processing on the generated image data according to a desired purpose of the image data.

A central processing unit (CPU) 153 extracts various sensing information, such as information regarding distance from the driver's vehicle to a peripheral vehicle, recognition information of driving lanes, recognition information of traffic lights, and detection information of pedestrian, from the image processed by the image processing device 151.

More specifically, the CPU 153 causes software to execute a program to extract the sensing information. In this case, hardware, which is partially or entirely a field programmable gate array (FPGA) or an application-specific-integrated-circuit (ASIC), may be installed to extract the sensing information.

At least one of the images processed by the image processing device 151 and the extracted various sensing information are temporarily or semi-permanently stored in an internal memory 152. The vehicle-mounted sensing device 140 includes an external interface (I/F) 156, which is an interface to the outside, to obtain a vehicle state signal 158 of a speed and an acceleration rate.

The vehicle-mounted sensing device 140 is able to make an appropriate decision for the automatic driving or to prevent danger, using the CPU 153 with software, based on the vehicle state signal 158 and the various sensing information. The vehicle-mounted sensing device 140 having made any decision outputs a vehicle control signal 157 to another device, which enables steering, decelerating, and accelerating of the vehicle as well as alerting the driver with a moving image or sound.

The vehicle-mounted sensing device 140 includes an operation unit 154 and a display unit 155. The operation unit 154 allows a user to change the setting, and the display unit 155 can display any information to the user.

The operation unit 154 and the display unit 155 may be directly incorporated in the vehicle-mounted sensing device 140. Alternatively, in some embodiments, the operation unit 154 and the display unit 155 may be separated from the vehicle-mounted sensing device 154. Alternatively, in some other embodiments, the operation unit 154 and the display unit 155 may be used in common with another operation unit and display unit for different purposes.

A sensing system is also applicable that incorporates the vehicle-mounted sensing device 140 and other sensing device, such as a light detection and ranging (LiDAR), a millimeter-wave radar, and a far-infrared camera to obtain both the various sensing information of the vehicle-mounted sensing device 140 and other sensing information of other sensing device.

A single image-forming lens 141 as the imaging lens IL is used in each of the vehicle-mounted camera 14A in FIG. 17 and the vehicle-mounted sensing device 140 in FIG. 18 in the present embodiments. In some embodiments, two imaging lenses IL may be used to constitute a stereo camera. In some other embodiments, three or more imaging lenses IL may be used to constitute a compound-eye camera.

When such a stereo camera is applied to the vehicle-mounted sensing device 140, a diopter difference is calculated based on the amount of misalignment of images of two imaging lenses, and a distance to a target object is obtained, thus providing more detailed driving support to drivers.

NUMERICAL EXAMPLES

A detailed description is given of Numerical Examples 1 through 7 of the imaging lens IL.

In each of Numerical Examples 1 through 7, the parallel plate CG of FIGS. 1 through 7 is disposed closest to the imaging plane Im. The parallel plate CG is assumed as a filter to cut off ultraviolet light and infrared light or a seal glass (cover glass) disposed in a complementary metal oxide semiconductor (CMOS) image sensor. The parallel plate is indicated as "cover glass" in data. In the present Examples, one filter or one cover glass is disposed as one parallel plate CG in the imaging lens IL. However, in some embodiments, a plurality of filters and cover glasses may be disposed in the imaging lens IL.

The symbols in the Numerical Examples represent as follows:

f: focal length of the entire system;

F: F number;

ω: half angle of view (unit: degree);

R: radius of curvature;

D: distance between surfaces (which is referred to also as surface distance);

Nd: refractive index with respect to the d line;

vd: Abbe number with respect to the d line;

K: conic constant of aspherical surface;

A4: 4th order aspherical coefficient;

A6: 6th order aspherical coefficient;

A8: 8th order aspherical coefficient;

A10: 10th order aspherical coefficient;

A12: 12th order aspherical coefficient; and

A14: 14th order aspherical coefficient.

The surface number is sequentially counted from the object side, and the aperture stop S, which is represented as "stop" in data, is also counted as a surface. The mathematical expression below defines an aspherical surface X using C, H, and A4 through A14:

$$X = CH^2/[1+\sqrt{\{1-(1+K)C^2H^2\}C^2H^2}\}] + A4 \cdot H^4 + A6 \cdot H^6 + A8 \cdot H^8 + A10 \cdot H^{10} + A12 \cdot H^{12} + A14 \cdot H^{14}$$

where

X is aspherical surface;

C is paraxial radius of curvature (inverse number of R); and

H is height from the optical axis.

A shape is identified by assigning the values of R, K, and A4 through A14.

The symbol "*" is given to the surface number of the aspherical surface in data. The unit of length, which is a dimension, is mm unless otherwise mentioned. In the imaging lens IL according to Numerical Examples 1 through 7, the first lens L1 and the third lens L3 are made of glass, and the second lens L2, the fourth lens L4, the fifth lens L5, and the sixth lens L6 are made of resin.

Numerical Example 1

Numerical Example 1 represents data regarding the imaging lens IL illustrated in FIG. 1.

The imaging lens IL according to Numerical Example 1 has a focal length f of 5.24, an F number of 2.00, and a half angle of view ω of 34.0°. Table 1 represents the data of Numerical Example 1.

TABLE 1

|   | R | D | Nd | vd | Refractive Index Temperature Coefficient ($10^{-6}/°$ C.) | | Note |
|---|---|---|----|----|-----------------------------------------------------------|---|------|
| 1 | 9.464 | 0.84 | 1.51633 | 64.14 | 2.80 | | First Lens |
| 2 | 3.265 | 0.73 | | | | | |
| 3* | 11.502 | 1.61 | 1.63790 | 23.20 | −120.00 | Resin | Second Lens |
| 4* | 8.150 | 0.22 | | | | | |
| 5 | 0.000 | 0.38 | | | | | Stop |
| 6 | 52.755 | 4.00 | 1.80400 | 46.58 | 4.80 | | Third Lens |
| 7 | −6.185 | 0.35 | | | | | |
| 8* | 4.335 | 2.26 | 1.53500 | 55.73 | −99.00 | Resin | Fourth Lens |
| 9* | −8.488 | 0.10 | | | | | |
| 10* | −14.146 | 0.75 | 1.63790 | 23.20 | −120.00 | Resin | Fifth Lens |
| 11* | 3.967 | 1.55 | | | | | |
| 12* | 3.549 | 2.21 | 1.53500 | 55.73 | −99.00 | Resin | Sixth Lens |
| 13* | 5.456 | 0.42 | | | | | |
| 14 | 0.000 | 0.50 | 1.51680 | 64.20 | | | Cover Glass |
| 15 | 0.000 | BF | | | | | |

In Table 1, the term "Refractive Index Temperature Coefficient ($10^{-6}/°$ C.)" represents a differential value dn/dt of a refractive index n of a lens material with a change in temperature within the range of 40° C. through 60° C., which is expressed in the unit of $10^{-6}/°$ C. The above-described "dnN/dt (N)" is obtained by multiplying the value (the refractive index temperature coefficients) of the first lens L1 by $10^6$. The above-described "dnP/dt (P)" is obtained by multiplying the value (the refractive index temperature coefficients) of the third lens L3 by $10^6$. The values of dnN/dt (N) and dnP/dt (P) are as represented in Table 1. The same applies to other Numerical Examples following Numerical Example 1.

The symbol "BF" denotes distance (back focus) from the image-side surface of the cover glass CG to the imaging plane Im.

Aspherical Surface Data

Tables 2-1 and 2-2 represents data regarding aspherical surfaces.

TABLE 2-1

|    | K | A4 | A6 | A8 |
|----|---|----|----|-----|
| 3  | −71.662 | 8.84557E−04 | −3.54166E−04 | −1.73349E−04 |
| 4  | −2.1284 | −3.69081E−03 | 5.21514E−04 | −3.09299E−05 |
| 8  | 0 | −1.34440E−03 | −1.88343E−04 | 5.65682E−06 |
| 9  | 0 | −4.56724E−03 | 1.66839E−03 | −3.77750E−04 |
| 10 | 0 | −2.05415E−04 | 3.50834E−03 | −1.03903E−03 |
| 11 | −0.2362 | −1.30444E−03 | 4.58340E−03 | −9.66870E−04 |
| 12 | −4.7629 | 7.71668E−04 | 6.53451E−05 | 2.21692E−05 |
| 13 | 0 | −9.30528E−03 | 2.27081E−04 | 9.16248E−06 |

TABLE 2-2

|    | A10 | A12 | A14 |
|----|-----|-----|-----|
| 3  | 6.81025E−05 | −7.45152E−06 | 0 |
| 4  | −5.83639E−06 | 0 | 0 |
| 8  | −5.79769E−07 | 0 | 0 |
| 9  | 3.77902E−05 | −1.00912E−06 | −3.42926E−08 |
| 10 | 1.18593E−04 | −4.71453E−06 | 0 |

TABLE 2-2-continued

| | A10 | A12 | A14 |
|---|---|---|---|
| 11 | 6.61906E−05 | 0 | 0 |
| 12 | −2.18355E−06 | 0 | 0 |
| 13 | 2.88449E−06 | −7.41930E−07 | 3.07218E−08 |

In Tables 2-1 and 2-2, the expression "3.07218E−08" refers to "$3.07218 \times 10^{-8}$". The same applies to the following Tables.

Values of Parameters of Conditional Formulas

Table 3 represents values of parameters of conditional formulas.

TABLE 3

| | |
|---|---|
| DL3/TL | 0.27 |
| fL3 − L4/f | 0.66 |
| DL5 − L6/TL | 0.10 |
| fL5/f | −0.91 |
| ν2G | 45.31 |
| fL1/f | −1.93 |
| fL3/fL4 | 1.24 |
| fL3/f | 1.35 |
| fL4 − L5 − L6/f | 2.53 |
| dnP/dt(P) − dnN/dt(N) | 2.00 |

Amount of Misalignment Between Image-Forming Position and Imaging Plane

The reference operational temperature of the imaging lens IL is 20° C. When the ambient temperature of the imaging lens IL in use decreases within the range from 20° C. to −40° C. or increases within the range from 20° C. to 95° C., the image-forming position of the imaging lens IL is misaligned with the imaging plane Im (photo-sensing surface) of the solid-state image sensor along the optical axis, i.e., the misalignment between the image-forming position and the imaging plane Im. The amounts of the misalignment between the image-forming position and the imaging plane Im are represented in Table 4.

TABLE 4

| | −45° C. | 20° C. | 95° C. |
|---|---|---|---|
| Image-Forming Position Misalignment | −15.5 μm | 0 μm | +18.4 μm |

The image-forming performance is evaluated as being in good condition even with changes in temperature, in the following cases. The amount of misalignment between the image-forming position and the imaging plane Im falls within the range of approximately ±25 μm with changes in temperature from the reference temperature of 20° C. The data of Numerical Example 1 falls within the range.

Numerical Example 2

Figure 2:
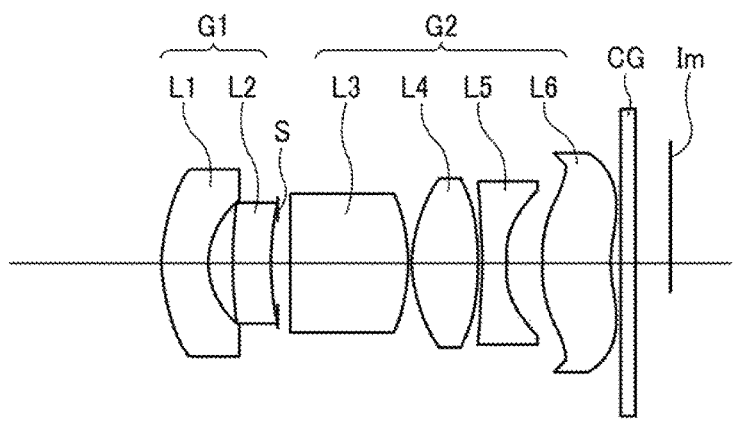
FIG. 2 is a sectional view of a configuration of an imaging lens according to Numerical Example 2.

Numerical Example 2 represents data regarding the imaging lens IL illustrated in FIG. 2.

The imaging lens IL according to Numerical Example 2 has a focal length f of 5.35, an F number of 2.00, and a half angle of view ω of 34.1°. Table 5 represents the data of Numerical Example 2.

TABLE 5

| | R | D | Nd | νd | Refractive Index Temperature Coefficient ($10^{-6}$/° C.) | | Note |
|---|---|---|---|---|---|---|---|
| 1 | 5.955 | 1.57 | 1.51633 | 64.14 | 2.80 | | First Lens |
| 2 | 2.728 | 0.81 | | | | | |
| 3* | 11.857 | 1.27 | 1.63790 | 23.20 | −120.00 | Resin | Second Lens |
| 4* | 7.551 | 0.21 | | | | | |
| 5 | 0.000 | 0.39 | | | | | Stop |
| 6 | 123.611 | 4.00 | 1.80400 | 46.58 | 4.80 | | Third Lens |
| 7 | −5.898 | 0.10 | | | | | |
| 8* | 4.188 | 2.27 | 1.53500 | 55.73 | −99.00 | Resin | Fourth Lens |
| 9* | −7.603 | 0.10 | | | | | |
| 10* | −15.212 | 0.75 | 1.63790 | 23.20 | −120.00 | Resin | Fifth Lens |
| 11* | 3.584 | 1.18 | | | | | |
| 12* | 3.876 | 2.35 | 1.53500 | 55.73 | −99.00 | Resin | Sixth Lens |
| 13* | 6.803 | 0.30 | | | | | |
| 14 | 0.000 | 0.50 | 1.51680 | 64.20 | | | Cover Glass |
| 15 | 0.000 | BF | | | | | |

Aspherical Surface Data

Tables 6-1 and 6-2 represent data regarding aspherical surfaces.

TABLE 6-1

| | K | A4 | A6 | A8 |
|---|---|---|---|---|
| 3 | −92.5 | −8.43119E−04 | −1.00948E−03 | 2.85035E−05 |
| 4 | −10.162 | −5.22554E−03 | 6.94189E−04 | −1.36090E−04 |
| 8 | 0 | −1.85022E−03 | −1.19403E−04 | −6.68767E−06 |
| 9 | 0 | −4.53856E−03 | 1.73429E−03 | −3.75978E−04 |
| 10 | 0 | −1.18613E−03 | 3.45615E−03 | −1.02190E−03 |
| 11 | −0.3701 | −3.62144E−03 | 5.10040E−03 | −1.05915E−03 |
| 12 | −6.08 | −1.04252E−03 | 2.25087E−04 | 2.69655E−05 |
| 13 | | −1.01015E−02 | 7.35863E−05 | 9.26693E−06 |

TABLE 6-2

| | A10 | A12 | A14 |
|---|---|---|---|
| 3 | 4.57584E−05 | −7.45152E−06 | 0 |
| 4 | 1.86765E−05 | 0 | 0 |
| 8 | 4.98962E−07 | 0 | 0 |
| 9 | 3.80547E−05 | −1.04693E−06 | 3.32079E−08 |
| 10 | 1.19018E−04 | −4.85957E−06 | 0 |
| 11 | 7.12627E−05 | 0 | 0 |
| 12 | −3.95341E−06 | 0 | 0 |
| 13 | 3.91117E−06 | −6.82577E−07 | 2.31176E−08 |

Values of Parameters of Conditional Formulas

Table 7 represents values of parameters of conditional formulas.

TABLE 7

| | |
|---|---|
| DL3/TL | 0.27 |
| fL3 − L4/f | 0.61 |
| DL5 − L6/TL | 0.08 |
| fL5/f | −0.84 |
| ν2G | 45.31 |
| fL1/f | −2.18 |
| fL3/fL4 | 1.31 |
| fL3/f | 1.33 |

TABLE 7-continued

| | |
|---|---|
| fL4 − L5 − L6/f | 2.38 |
| dnP/dt(P) − dnN/dt(N) | 2.00 |

Amount of Misalignment Between Image-Forming Position and Imaging Plane Table 8 represents the amounts of misalignment between the image-forming position and the imaging plane Im, same as Table 4.

TABLE 8

| | −45° C. | 20° C. | 95° C. |
|---|---|---|---|
| Image-Forming Position Misalignment | −16.6 μm | 0 μm | +19.6 μm |

Numerical Example 3

Figure 3:
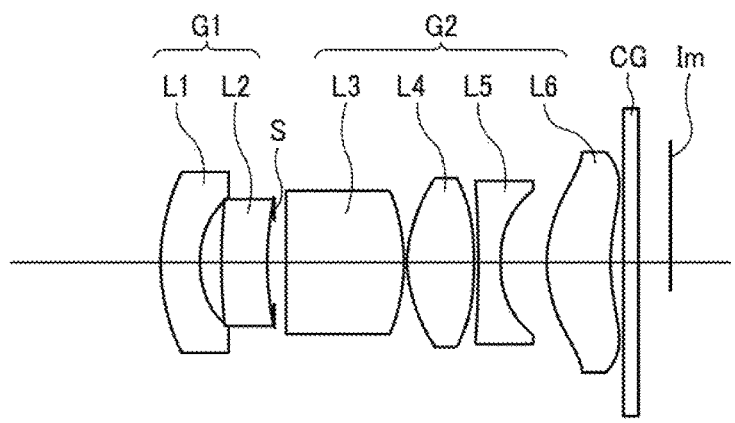
FIG. 3 is a sectional view of a configuration of an imaging lens according to Numerical Example 3.

Numerical Example 3 represents data regarding the imaging lens IL illustrated in FIG. 3.

The imaging lens IL according to Numerical Example 3 has a focal length f of 5.23, an F number of 2.00, and a half angle of view ω of 34.0°. Table 13 represents the data of Numerical Example 9.

TABLE 9

| | R | D | Nd | vd | Refractive Index Temperature Coefficient ($10^{-6}$/° C.) | Note |
|---|---|---|---|---|---|---|
| 1 | 6.851 | 1.25 | 1.51633 | 64.14 | 2.80 | First Lens |
| 2 | 2.938 | 0.76 | | | | |
| 3* | 11.393 | 1.54 | 1.63790 | 23.20 | −120.00 | Resin Second Lens |
| 4* | 7.838 | 0.22 | | | | |
| 5 | 0.000 | 0.40 | | | | Stop |
| 6 | 0.000 | 3.96 | 1.80400 | 46.58 | 4.80 | Third Lens |
| 7 | −5.708 | 0.10 | | | | |
| 8* | 4.319 | 2.25 | 1.53500 | 55.73 | −99.00 | Resin Fourth Lens |
| 9* | −8.156 | 0.10 | | | | |
| 10* | −13.129 | 0.75 | 1.63790 | 23.20 | −120.00 | Resin Fifth Lens |
| 11* | 3.963 | 1.52 | | | | |
| 12* | 3.579 | 2.15 | 1.53500 | 55.73 | −99.00 | Resin Sixth Lens |
| 13* | 5.671 | 0.42 | | | | |
| 14 | 0.000 | 0.50 | 1.51680 | 64.20 | | Cover Glass |
| 15 | 0.000 | BF | | | | |

Aspherical Surface Data

Tables 10-1 and 10-2 show data regarding aspherical surfaces below.

TABLE 10-1

| | K | A4 | A6 | A8 |
|---|---|---|---|---|
| 3 | −66.6899 | 8.06E−04 | −3.68900E−04 | −1.54536E−04 |
| 4 | −1.92601 | −3.65331E−03 | 5.38174E−04 | −1.44496E−05 |
| 8 | 0 | −1.38750E−03 | −1.92842E−04 | 5.91015E−06 |
| 9 | 0 | −4.53310E−03 | 1.67490E−03 | −3.77324E−04 |
| 10 | 0 | −1.80315E−04 | 3.50545E−03 | −1.03919E−03 |
| 11 | −0.27824 | −1.41101E−03 | 4.56062E−03 | −9.64981E−04 |
| 12 | −4.87874 | 6.34E−04 | 8.44804E−05 | 2.19771E−05 |
| 13 | 0 | −9.20714E−03 | 2.31367E−04 | 9.39952E−06 |

TABLE 10-2

| | A10 | A12 | A14 |
|---|---|---|---|
| 3 | 6.42209E−05 | −7.45152E−06 | 0.00000E+00 |
| 4 | −1.15330E−05 | 0 | 0 |
| 8 | −5.48320E−07 | 0 | 0 |
| 9 | 3.78591E−05 | −1.01610E−06 | −3.37310E−08 |
| 10 | 1.18993E−04 | −4.72691E−06 | 0 |
| 11 | 6.63678E−05 | 0 | 0 |
| 12 | −2.26815E−06 | 0 | 0 |
| 13 | 2.94167E−06 | −7.46495E−07 | 3.06328E−08 |

Values of Parameters of Conditional Formulas

Table 11 represents values of parameters of conditional formulas.

TABLE 11

| | |
|---|---|
| DL3/TL | 0.26 |
| fL3 − L4/f | 0.63 |
| DL5 − L6/TL | 0.10 |
| fL5/f | −0.90 |
| v2G | 45.31 |
| fL1/f | −2.14 |
| fL3/fL4 | 1.26 |
| fL3/f | 1.36 |
| fL4 − L5 − L6/f | 2.53 |
| dnP/dt(P) − dnN/dt(N) | 2.00 |

Amount of Misalignment Between Image-Forming Position and Imaging Plane Table 12 represents the amounts of misalignment between the image-forming position and the imaging plane Im.

TABLE 12

| | −45° C. | 20° C. | 95° C. |
|---|---|---|---|
| Image-Forming Position Misalignment | −15.1 μm | 0 μm | +17.9 μm |

Numerical Example 4

Figure 4:
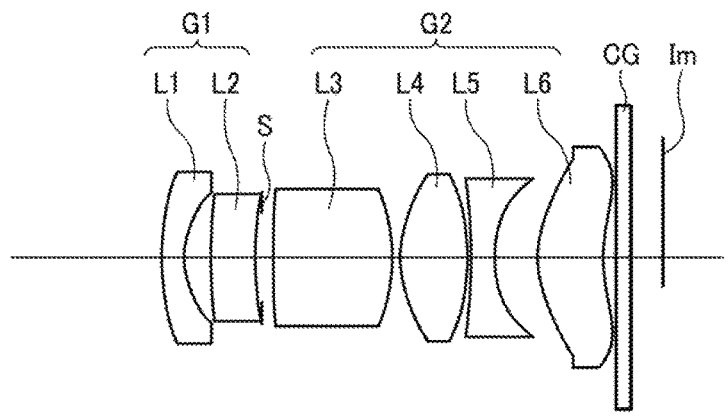
FIG. 4 is a sectional view of a configuration of an imaging lens according to Numerical Example 4.

Numerical Example 4 represents data regarding the imaging lens IL illustrated in FIG. 4.

The imaging lens IL according to Numerical Example 4 has a focal length f of 5.26, an F number of 2.00, and a half angle of view ω of 34.0°. Table 13 represents the data of Numerical Example 4.

TABLE 13

| | R | D | Nd | vd | Refractive Index Temperature Coefficient ($10^{-6}$/° C.) | Note |
|---|---|---|---|---|---|---|
| 1 | 8.142 | 0.75 | 1.48749 | 70.24 | −0.50 | First Lens |
| 2 | 3.230 | 0.91 | | | | |
| 3* | 10.703 | 1.53 | 1.63790 | 23.20 | −120.00 | Resin Second Lens |
| 4* | 6.773 | 0.25 | | | | |
| 5 | 0.000 | 0.38 | | | | Stop |
| 6 | 64.169 | 4.00 | 1.83481 | 42.72 | 4.70 | Third Lens |
| 7 | −6.345 | 0.27 | | | | |
| 8* | 4.322 | 2.30 | 1.53500 | 55.73 | −99.00 | Resin Fourth Lens |
| 9* | −7.470 | 0.10 | | | | |
| 10* | −10.633 | 0.75 | 1.63790 | 23.20 | −120.00 | Resin Fifth Lens |

TABLE 13-continued

| | R | D | Nd | vd | Refractive Index Temperature Coefficient ($10^{-6}$/° C.) | Note |
|---|---|---|---|---|---|---|
| 11* | 4.076 | 1.52 | | | | |
| 12* | 3.544 | 2.24 | 1.53500 | 55.73 | −99.00 | Resin Sixth Lens |
| 13* | 5.587 | 0.42 | | | | |
| 14 | 0.000 | 0.50 | 1.51680 | 64.20 | | Cover Glass |
| 15 | 0.000 | BF | | | | |

Aspherical Surface Data
Tables 14-1 and 14-2 show data regarding the respective aspherical surfaces below.

TABLE 14-1

| | K | A4 | A6 | A8 |
|---|---|---|---|---|
| 3 | −60.192 | 7.15E−04 | −2.99484E−04 | −1.92989E−04 |
| 4 | −2.266 | −3.96894E−03 | 5.86683E−04 | −4.34962E−05 |
| 8 | 0 | −1.07589E−03 | −1.94981E−04 | 8.71216E−06 |
| 9 | 0 | −4.10167E−03 | 1.69132E−03 | −3.78877E−04 |
| 10 | 0 | −1.62526E−04 | 3.49337E−03 | −1.03857E−03 |
| 11 | −0.2854 | −1.40092E−03 | 4.50184E−03 | −9.54987E−04 |
| 12 | −4.806 | 8.91E−04 | 7.70123E−04 | 2.04118E−05 |
| 13 | 0 | −9.37808E−03 | 2.59187E−04 | 1.14542E−05 |

TABLE 14-2

| | A10 | A12 | A14 |
|---|---|---|---|
| 3 | 7.03614E−05 | −7.45152E−06 | 0.00000E+00 |
| 4 | −4.63892E−06 | 0 | 0 |
| 8 | −7.65643E−07 | 0 | 0 |
| 9 | 3.75628E−05 | −9.77655E−07 | −3.28136E−08 |
| 10 | 1.19072E−04 | −4.68310E−06 | 0 |
| 11 | 6.69026E−05 | 0 | 0 |
| 12 | −2.16515E−06 | 0 | 0 |
| 13 | 2.58920E−06 | −7.55825E−07 | 3.20686E−08 |

Values of Parameters of Conditional Formulas
Table 15 represents values of parameters of conditional formulas.

TABLE 15

| | |
|---|---|
| DL3/TL | 0.27 |
| fL3 − L4/f | 0.64 |
| DL5 − L6/TL | 0.10 |
| fL5/f | −0.86 |
| ν2G | 44.35 |
| fL1/f | −2.20 |
| fL3/fL4 | 1.29 |
| fL3/f | 1.35 |
| fL4 − L5 − L6/f | 2.51 |
| dnP/dt(P) − dnN/dt(N) | 5.20 |

Amount of Misalignment Between Image-Forming Position and Imaging Plane
Table 16 represents the amounts of misalignment between the image-forming position and the imaging plane Im.

TABLE 16

| | −45° C. | 20° C. | 95° C. |
|---|---|---|---|
| Image-Forming Position Misalignment | −6.4 μm | 0 μm | +8.5 μm |

Numerical Example 5

Figure 5:
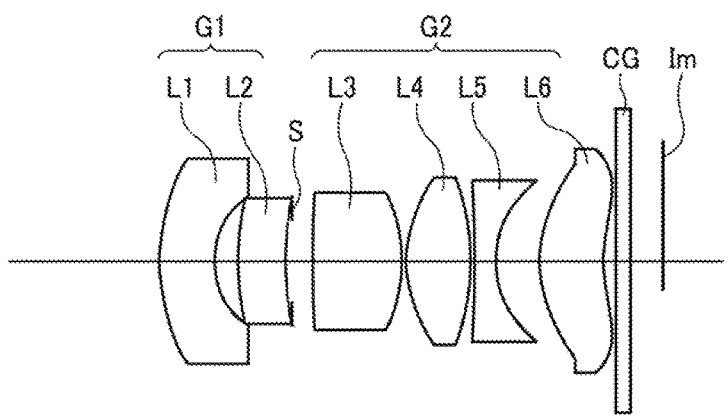
FIG. 5 is a sectional view of a configuration of an imaging lens according to Numerical Example 5.

Numerical Example 5 represents data regarding the imaging lens IL illustrated in FIG. 5.

The imaging lens IL according to Numerical Example 5 has a focal length f of 5.24, an F number of 2.00, and a half angle of view ω of 33.9°. Table 17 represents the data of Numerical Example 5.

TABLE 17

| | R | D | Nd | vd | Refractive Index Temperature Coefficient ($10^{-6}$/° C.) | Note |
|---|---|---|---|---|---|---|
| 1 | 7.071 | 1.83 | 1.51633 | 64.14 | 2.80 | First Lens |
| 2 | 2.684 | 0.79 | | | | |
| 3* | 7.116 | 1.61 | 1.63790 | 23.20 | −120.00 | Resin Second Lens |
| 4* | 5.688 | 0.26 | | | | |
| 5 | 0.000 | 0.69 | | | | Stop |
| 6 | 74.662 | 3.00 | 1.72916 | 54.68 | 4.20 | Third Lens |
| 7 | −5.303 | 0.10 | | | | |
| 8* | 4.357 | 2.21 | 1.53500 | 55.73 | −99.00 | Resin Fourth Lens |
| 9* | −9.799 | 0.10 | | | | |
| 10* | −18.239 | 0.75 | 1.63790 | 23.20 | −120.00 | Resin Fifth Lens |
| 11* | 4.183 | 1.46 | | | | |
| 12* | 3.388 | 2.19 | 1.53500 | 55.73 | −99.00 | Resin Sixth Lens |
| 13* | 5.256 | 0.42 | | | | |
| 14 | 0.000 | 0.50 | 1.51680 | 64.20 | | Cover Glass |
| 15 | 0.000 | BF | | | | |

Aspherical Surface Data
Tables 18-1 and 18-2 show data regarding the respective aspherical surfaces below.

TABLE 18-1

| | K | A4 | A6 | A8 |
|---|---|---|---|---|
| 3 | −20.777 | 2.87776E−03 | −3.75735E−04 | −1.87715E−04 |
| 4 | −1.6691 | −3.74455E−03 | 5.10275E−04 | −7.55947E−05 |
| 8 | 0 | −1.29427E−03 | −1.97818E−04 | 9.19561E−06 |
| 9 | 0 | −5.05092E−03 | 1.65957E−03 | −3.77316E−04 |
| 10 | 0 | 2.95209E−04 | 3.50586E−03 | −1.04212E−03 |
| 11 | −0.1777 | −1.27375E−03 | 4.69866E−03 | −9.60099E−04 |
| 12 | −4.4232 | 3.96826E−04 | 8.18354E−05 | 2.41344E−05 |
| 13 | 0 | −1.03884E−02 | 2.77230E−04 | 9.85697E−06 |

TABLE 18-2

| | A10 | A12 | A14 |
|---|---|---|---|
| 3 | 6.67293E−05 | −7.45152E−06 | 0 |
| 4 | −7.71063E−06 | 0 | 0 |
| 8 | −8.59490E−07 | 0 | 0 |
| 9 | 3.79689E−05 | −9.77998E−07 | −3.88749E−08 |
| 10 | 1.18170E−04 | −4.64641E−06 | 0 |
| 11 | 6.45876E−05 | 0 | 0 |
| 12 | −2.33960E−06 | 0 | 0 |
| 13 | 2.84958E−06 | −7.39971E−07 | 3.02790E−08 |

Values of Parameters of Conditional Formulas
Table 19 represents values of parameters of conditional formulas.

TABLE 19

| | |
|---|---|
| DL3/TL | 0.20 |
| fL3 − L4/f | 0.64 |
| DL5 − L6/TL | 0.10 |
| fL5/f | −1.00 |
| ν2G | 47.34 |
| fL1/f | −1.86 |
| fL3/fL4 | 1.16 |
| fL3/f | 1.32 |
| fL4 − L5 − L6/f | 2.22 |
| dnP/dt(P) − dnN/dt(N) | 1.40 |

Amount of Misalignment Between Image-Forming Position and Imaging Plane

Table 20 represents the amounts of misalignment between the image-forming position and the imaging plane Im.

TABLE 20

| | −45° C. | 20° C. | 95° C. |
|---|---|---|---|
| Image-Forming Position Misalignment | −19.9 μm | 0 μm | +23.4 μm |

Numerical Example 6

Figure 6:
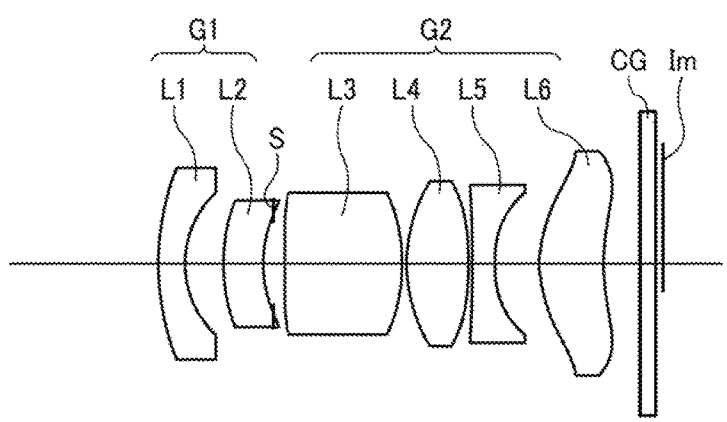
FIG. 6 is a sectional view of a configuration of an imaging lens according to Numerical Example 6.

Numerical Example 6 represents data regarding the imaging lens IL illustrated in FIG. 6.

The imaging lens IL according to Numerical Example 6 has a focal length f of 5.30, an F number of 2.00, and a half angle of view ω of 33.9°. Table 21 represents the data of Numerical Example 6.

TABLE 21

| | R | D | Nd | νd | Refractive Index Temperature Coefficient ($10^{-6}$/° C.) | Notes |
|---|---|---|---|---|---|---|
| 1 | 8.916 | 0.88 | 1.51633 | 64.14 | 2.80 | First Lens |
| 2 | 3.281 | 1.28 | | | | |
| 3* | 4.801 | 1.36 | 1.82115 | 24.06 | −0.20 | Second Lens |
| 4* | 3.677 | 0.38 | | | | |
| 5 | 0.000 | 0.35 | | | | Stop |
| 6 | 23.478 | 4.00 | 1.77250 | 49.60 | 4.70 | Third Lens |
| 7 | −5.458 | 0.10 | | | | |
| 8* | 4.649 | 2.07 | 1.53500 | 55.73 | −99.00 | Resin Fourth Lens |
| 9* | −10.516 | 0.10 | | | | |
| 10* | −20.600 | 0.75 | 1.63790 | 23.20 | −120.00 | Resin Fifth Lens |
| 11* | 3.811 | 1.51 | | | | |
| 12* | 3.591 | 2.22 | 1.53500 | 55.73 | −99.00 | Resin Sixth Lens |
| 13* | 5.872 | 1.25 | | | | |
| 14 | 0.000 | 0.50 | 1.51680 | 64.20 | | Cover Glass |
| 15 | 0.000 | BF | | | | |

Aspherical Surface Data

Tables 22-1 and 22-2 represent data regarding aspherical surfaces.

TABLE 22-1

| | K | A4 | A6 | A8 |
|---|---|---|---|---|
| 3 | −8.307 | 5.44466E−03 | −5.27872E−04 | −1.89360E−04 |
| 4 | −1.5505 | −6.39236E−04 | 1.41039E−05 | 1.07323E−04 |

TABLE 22-1-continued

| | K | A4 | A6 | A8 |
|---|---|---|---|---|
| 8 | 0 | −1.20831E−03 | −2.03634E−04 | 1.46419E−05 |
| 9 | 0 | −5.12209E−03 | 1.57618E−03 | −3.76883E−04 |
| 10 | 0 | −8.95892E−04 | 3.49836E−03 | −1.04410E−03 |
| 11 | −0.4023 | −1.91150E−03 | 4.49460E−03 | −9.66816E−04 |
| 12 | −4.7782 | 1.20860E−03 | 2.30164E−05 | 2.24560E−05 |
| 13 | 0 | −8.54059E−03 | 1.83359E−04 | 3.76651E−06 |

TABLE 22-2

| | A10 | A12 | A14 |
|---|---|---|---|
| 3 | 6.90635E−05 | −7.45151E−06 | 0 |
| 4 | −3.59053E−05 | 0 | 0 |
| 8 | −6.96654E−07 | 0 | 0 |
| 9 | 3.90632E−05 | −9.36865E−07 | −4.53102E−08 |
| 10 | 1.17430E−04 | −4.48137E−06 | 0 |
| 11 | 6.74970E−05 | 0 | 0 |
| 12 | −2.00668E−06 | 0 | 0 |
| 13 | 3.66269E−06 | −7.20541E−07 | 2.81050E−08 |

Values of Parameters of Conditional Formulas

Table 23 represents values of parameters of conditional formulas.

TABLE 23

| | |
|---|---|
| DL3/TL | 0.27 |
| fL3 − L4/f | 0.64 |
| DL5 − L6/TL | 0.10 |
| fL5/f | −0.95 |
| ν2G | 46.07 |
| fL1/f | −2.02 |

Amount of Misalignment Between Image-Forming Position and Imaging Plane Table 24 represents the amounts of misalignment between the image-forming position and the imaging plane Im.

TABLE 24

| | −45° C. | 20° C. | 95° C. |
|---|---|---|---|
| Image-Forming Position Misalignment | −19.0 μm | 0 μm | +22.2 μm |

Numerical Example 7

Figure 7:
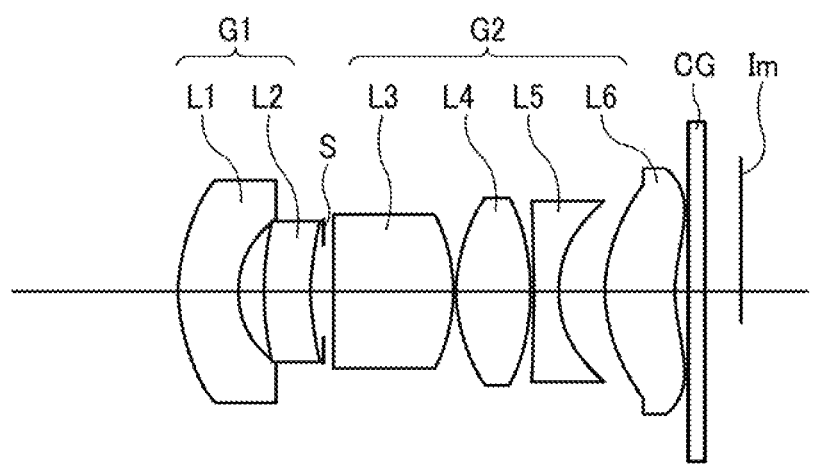
FIG. 7 is a sectional view of a configuration of an imaging lens according to Numerical Example 7.
Figure 10:
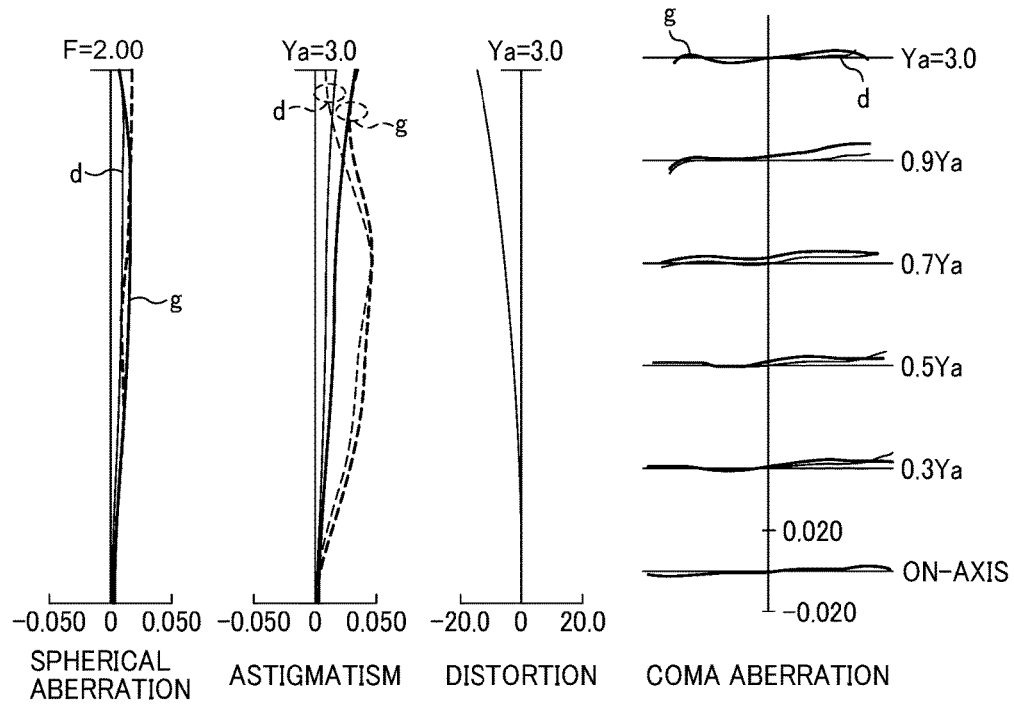
FIG. 10 illustrates aberration diagrams of the imaging lens according to Numerical Example 3.
Figure 11:
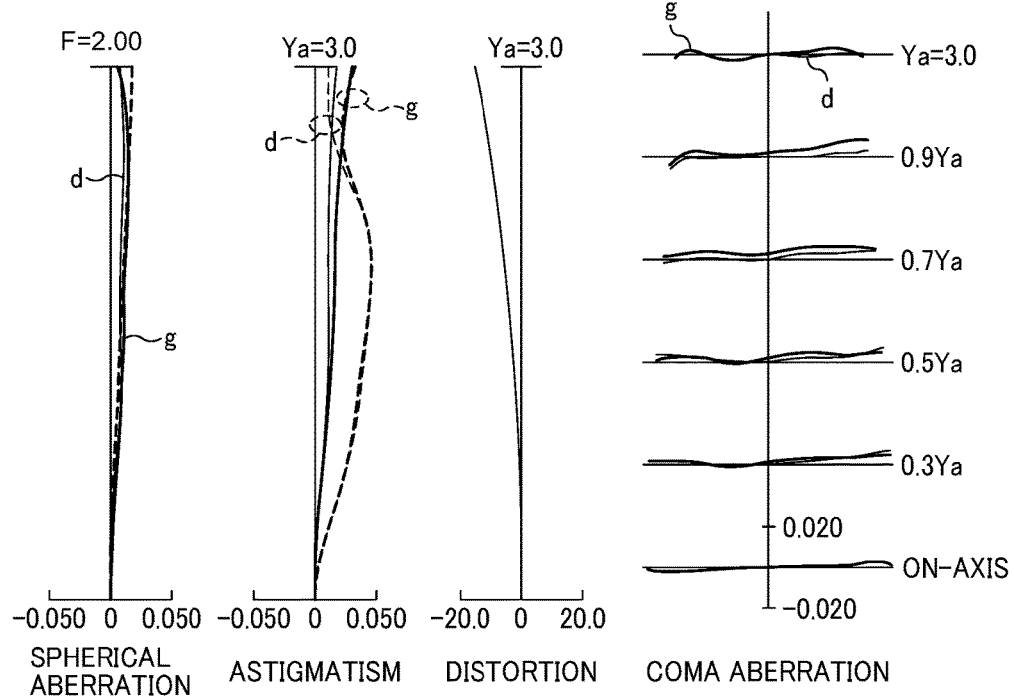
FIG. 11 illustrates aberration diagrams of the imaging lens according to Numerical Example 4.
Figure 12:
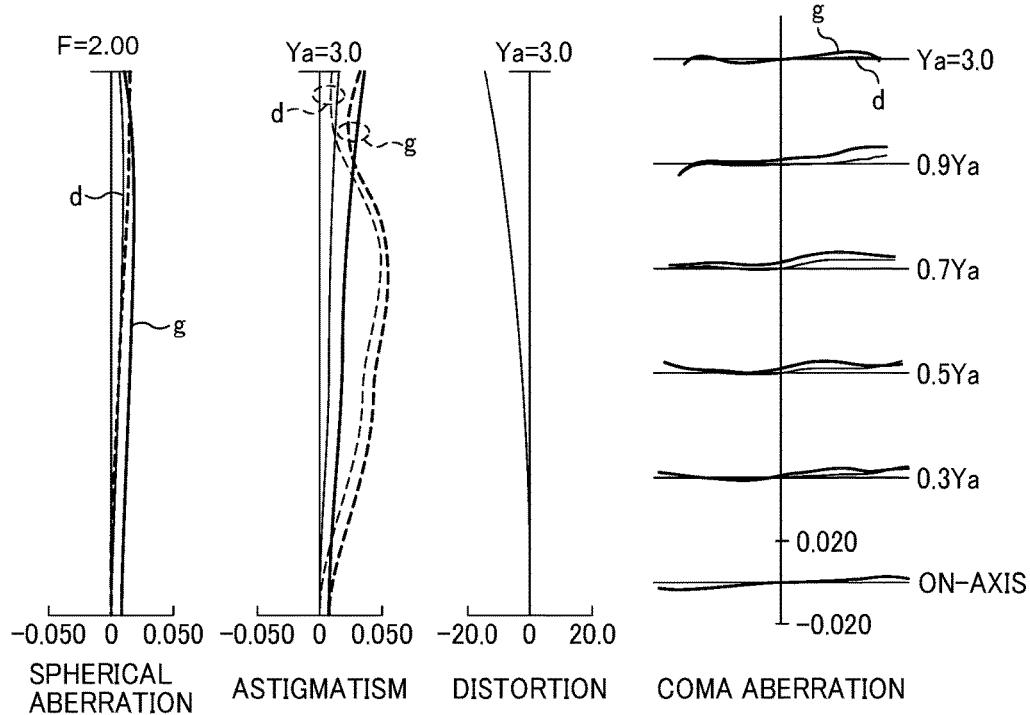
FIG. 12 illustrates aberration diagrams of the imaging lens according to Numerical Example 5.
Figure 13:
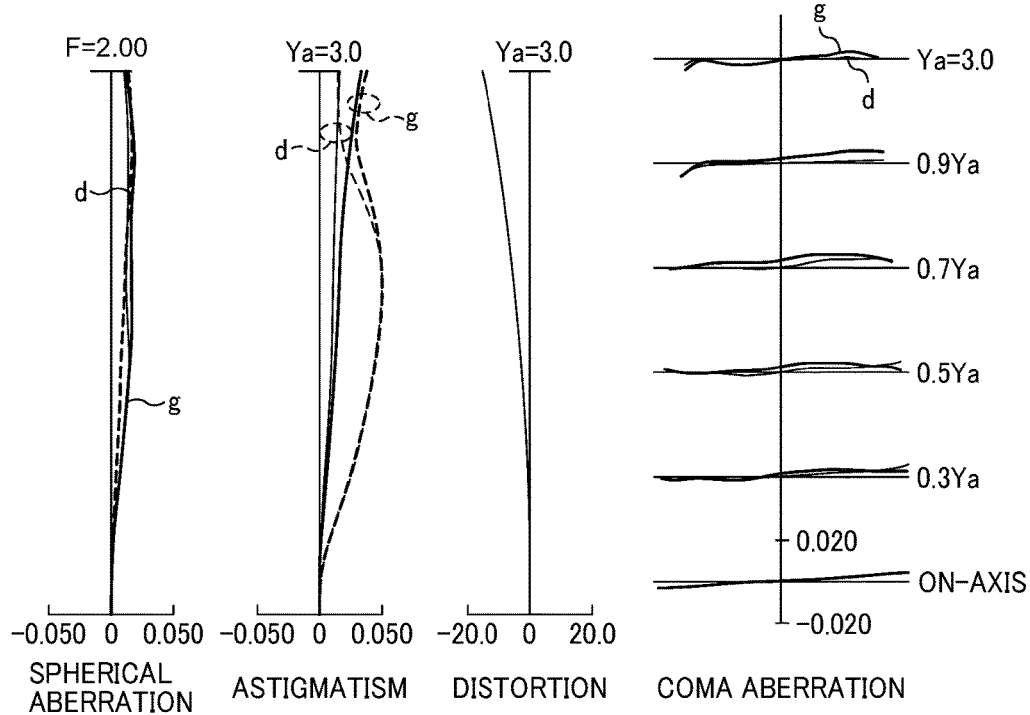
FIG. 13 illustrates aberration diagrams of the imaging lens according to Numerical Example 6.
Figure 14:
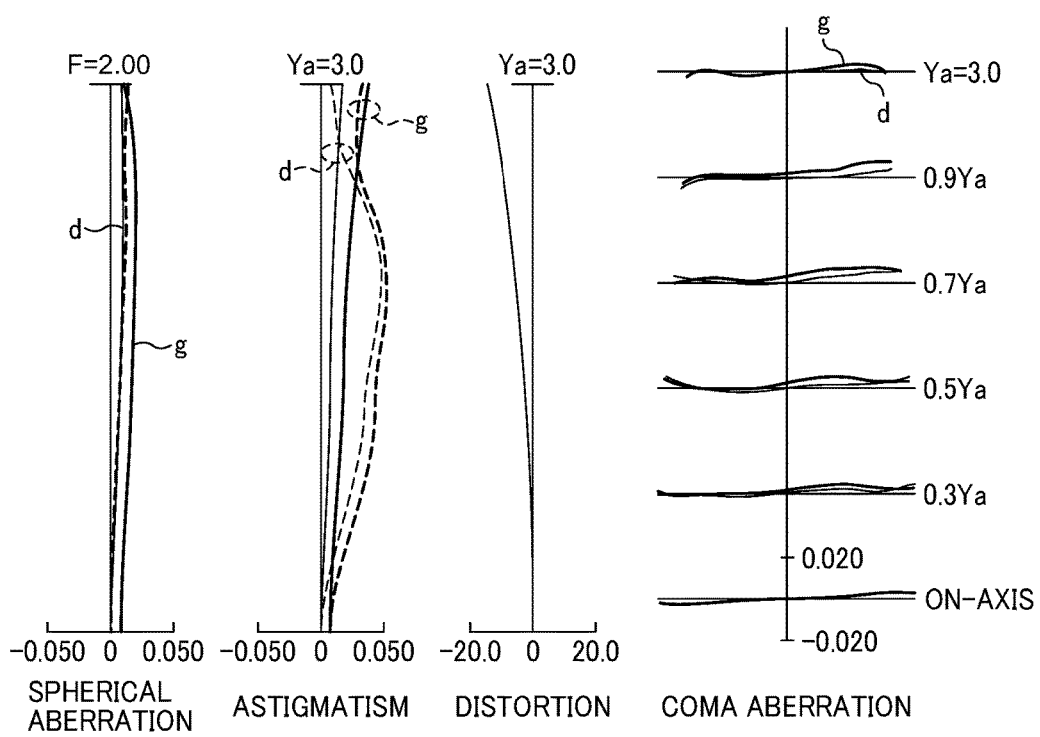
FIG. 14 illustrates aberration diagrams of the imaging lens according to Numerical Example 7.

Numerical Example 7 represents data regarding the imaging lens IL illustrated in FIG. 7.

The imaging lens IL according to Numerical Example 7 has a focal length f of 5.33, an F number of 2.00, and a half angle of view ω of 34.1°. Table 25 represents the data of Numerical Example 7.

TABLE 25

| | R | D | Nd | νd | Refractive Index Temperature Coefficient ($10^{-6}$/° C.) | Note |
|---|---|---|---|---|---|---|
| 1 | 5.750 | 1.80 | 1.51633 | 64.14 | 2.80 | First Lens |
| 2 | 2.615 | 0.77 | | | | |
| 3* | 7.265 | 1.40 | 1.63790 | 23.20 | −120.00 | Resin Second Lens |
| 4* | 5.213 | 0.40 | | | | |

TABLE 25-continued

| R | D | Nd | vd | Refractive Index Temperature Coefficient ($10^{-6}$/° C.) | Note |
|---|---|---|---|---|---|
| 5 | 0.000 | 0.28 | | | Stop |
| 6 | −400.000 | 3.66 | 1.77250 | 49.60 | 4.70 | Third Lens |
| 7 | −5.357 | 0.10 | | | |
| 8* | 4.335 | 2.25 | 1.53500 | 55.73 | −99.00 | Resin Fourth Lens |
| 9* | −7.862 | 0.10 | | | |
| 10* | −13.183 | 0.75 | 1.63790 | 23.20 | −120.00 | Resin Fifth Lens |
| 11* | 4.209 | 1.37 | | | |
| 12* | 3.367 | 2.12 | 1.53500 | 55.73 | −99.00 | Resin Sixth Lens |
| 13* | 5.446 | 0.42 | | | |
| 14 | 0.000 | 0.50 | 1.51680 | 64.20 | | Cover Glass |
| 15 | 0.000 | BF | | | |

Aspherical Surface Data

Tables 26-1 and 26-2 represent data regarding aspherical surfaces.

TABLE 26-1

| | K | A4 | A6 | A8 |
|---|---|---|---|---|
| 3 | −21.245 | 1.89174E−03 | −5.31579E−04 | −1.08719E−04 |
| 4 | −1.5711 | −4.05900E−03 | −1.41149E−05 | 3.18423E−04 |
| 8 | 0 | −1.36032E−03 | −2.09499E−04 | 1.11698E−05 |
| 9 | 0 | −4.97429E−03 | 1.73323E−03 | −3.77223E−04 |
| 10 | 0 | 6.14517E−04 | 3.47636E−03 | −1.03966E−03 |
| 11 | −0.3031 | −1.29680E−03 | 4.70756E−03 | −9.53991E−04 |
| 12 | −4.4417 | 6.38995E−06 | 9.96703E−05 | 2.57219E−05 |
| 13 | 0 | −1.02978E−02 | 1.86501E−04 | 1.43023E−05 |

TABLE 26-2

| | A10 | A12 | A14 |
|---|---|---|---|
| 3 | 5.57351E−05 | −7.30349E−06 | 0 |
| 4 | −9.44406E−05 | 0 | 0 |
| 8 | −1.167351−06 | 0 | 0 |
| 9 | 3.74312E−05 | −1.04036E−06 | −3.20325E−08 |
| 10 | 1.19076E−04 | −4.72478E−06 | 0 |
| 11 | 6.42155E−05 | 0 | 0 |
| 12 | −2.50551E−06 | 0 | 0 |
| 13 | 3.54916E−06 | −7.73874E−07 | 2.94940E−08 |

Values of Parameters of Conditional Expressions

Table 27 represents values of parameters in the conditional expressions.

TABLE 27

| | |
|---|---|
| DL3/TL | 0.24 |
| fL3 − L4/f | 0.62 |
| DL5 − L6/TL | 0.09 |
| fL5/f | −0.93 |
| v2G | 46.07 |
| fL1/f | −2.19 |
| fL3/fL4 | 1.25 |
| fL3/f | 1.33 |
| fL4 − L5 − L6/f | 2.11 |
| dnP/dt(P) − dnN/dt(N) | 1.90 |

Amount of Misalignment Between Image-Forming Position and Imaging Plane

Table 28 represents the amounts of misalignment between the image-forming position and the imaging plane Im.

TABLE 28

| | −45° C. | 20° C. | 95° C. |
|---|---|---|---|
| Image-Forming Position Misalignment | −17.5 μm | 0 μm | +20.6 μm |

FIGS. 8 through 14 are illustrations of aberration diagrams of imaging lenses IL according to Numerical Examples 1 through 7, respectively. In the aberration diagrams of FIGS. 8 through 14, the broken lines in spherical aberration indicate "sine condition", and the solid lines and broken lines in astigmatism indicate "sagittal" and "meridional", respectively. The symbol "d" denotes the d-line, and the symbol "g" is the g-line. In the aberration diagrams, the symbol "Ya" denotes a maximum image height of 3 mm that is common between Numerical Examples 1 through 7.

In the imaging lens IL according to each Numerical Example, various aberrations are successfully corrected. Further, the imaging lens IL according to each Numerical Example has a wide angle of view of approximately 680 and a large aperture diameter with an F number of less than or equal to 2. The imaging lens IL according to each Numerical Example is also compact including six lenses, and forms an image having aberrations successfully corrected over the range including the most peripheral area of the image.

In the imaging lens IL according to each Numerical Example, the amount of misalignment between the image-forming position and the imaging plane Im (photo-sensing surface) of the solid-state image sensor fall within the range of ±25 μm even when the ambient temperature of the imaging lens IL in use changes within the range from −40° C. to 95° C. with reference to 20° C. Thus, the imaging lens IL according to each Numerical Example can maintain stable imaging performance over a wide range of the operational temperature.

According to the embodiments of the present disclosure, the imaging lens, the vehicle-mounted camera, the sensing device, and the vehicle-mounted sensing device can be implemented as follows.

Aspect 1

An imaging lens IL includes a first lens group (G1) having negative refractive power, an aperture stop (S), and a second lens group (G2) having positive refractive power. The first lens group (G1), the aperture stop (S), and the second lens group (G2) are sequentially disposed in a direction from an object side to an image side. The first lens group (G1) includes a first lens (L1) that is a negative lens having a negative meniscus shape with a convex surface facing the object side and a second lens (L2) that is a negative lens having a negative meniscus shape with a convex surface facing the object side. The first lens (L1) and the second lens (L2) are sequentially disposed in that order from the object side to the image side. The second lens group (G2) includes a third lens (L3) that is a positive lens having a convex surface facing the image side, a fourth lens (L4) that is a positive lens having a biconvex shape, a fifth lens (L5) that is a negative lens having a biconcave shape, and a sixth lens (L6). The sixth lens (L6) has an aspherical surface with a concave surface facing the image side near an optical axis and a convex surface facing the image side in a marginal area. The third lens (L3), the fourth lens (L4), the fifth lens (L5), and the sixth lens (L6) are sequentially disposed in that order from the object side to the image side. Conditional formula (1) below is satisfied:

$$0.16 < DL3/TL < 0.32 \quad (1)$$

where

DL3 is a center thickness of the third lens (L3), and

TL is distance between an object-side surface of the first lens (L1) and an image-side surface of the sixth lens (L6) along the optical axis.

Aspect 2

The imaging lens IL according to Aspect 1, conditional formula (2) below is satisfied:

$$0.45 < fL3 - L4/f < 0.80 \quad (2),$$

Where f is focal length of an entire system of the imaging lens IL, and fL3−L4 is combined focal length of the third lens (L3) and the fourth lens (L4) in the second lens group (G2) (Examples 1 through 7).

Aspect 3

The imaging lens IL according to Aspect 1 or 2, conditional formula (3) below is satisfied:

$$0.04 < DL5 - L6/TL < 0.15 \quad (3)$$

where

TL is distance between an object-side surface of the first lens (L1) and the image-side surface of the sixth lens (L6) along the optical axis, and DL5−L6 is distance between an image-side surface of the fifth lens (L5) and an object-side surface of the sixth lens (L6) along the optical axis (Examples 1 through 7).

Aspect 4

The imaging lens IL according to any of Aspects 1 through 3, conditional formula (4) below is satisfied:

$$-1.20 < fL5/f < -0.55 \quad (4)$$

where fL5 is focal length of the fifth lens (L5), and f is the focal length of the entire system of the imaging lens IL (Examples 1 through 7).

Aspect 5

The imaging lens IL according to any of Aspects 1 through 4, conditional formula (5) below is satisfied:

$$38 < v2G < 55 \quad (5)$$

where v2G is an average value of Abbe numbers of materials of the third lens (L3), the fourth lens (L4), the fifth lens (L5), and the sixth lens (L6) of the second lens group (G2) (Examples 1 through 7).

Aspect 6

The imaging lens IL according to any of Aspects 1 through 5, conditional formula (6) below is satisfied:

$$-2.70 < fL1/f < -1.50 \quad (6)$$

where fL1 is focal length of the first lens (L1), and f is the entire system of the imaging lens IL (Examples 1 through 7).

Aspect 7

The imaging lens IL according to any of Aspects 1 through 6, each of the second lens (L2), the fourth lens (L4), and the fifth lens (L5) has at least one aspherical surface (Examples 1 through 7).

Aspect 8

The imaging lens IL according to any of Aspects 1 through 7, the first lens (L1) and the third lens (L3) are made of glass. The second lens (L2), the fourth lens (L4), the fifth lens (L5), and the sixth lens (L6) are made of resin (Examples 1 through 5, and 7).

Aspect 9

The imaging lens IL according to Aspect 8, conditional formula (7) below is satisfied:

$$0.90 < fL3/fL4 < 1.60 \quad (7)$$

where fL3 is focal length of the third lens (L3), and fL4 is focal length of the fourth lens (L4) (Examples 1 through 5, and 7).

Aspect 10

The imaging lens IL according to Aspect 9, conditional formula (8) below is satisfied:

$$1.05 < fL3/f < 1.60 \quad (8)$$

where fL3 is the focal length of the third lens (L3), and f is the focal length of the entire system of the imaging lens IL (Examples 1 through 5, and 7).

Aspect 11

The imaging lens IL according to Aspect 9 or 10, conditional formula (9) below is satisfied:

$$1.70 < fL4 - L5 - L6/f < 3.10 \quad (9)$$

where fL4−L5−L6 is combined focal length of the fourth lens (L4), the fifth lens (L5), and the sixth lens (L6) (Examples 1 through 5, and 7).

Aspect 12

The imaging lens IL according to any of Aspects 9 through 11, conditional formula (10) below is satisfied:

$$0 < dnP/dt(P) - dnN/dt(N) < 8.0 \quad (10)$$

where dnP/dt (P) is refractive index temperature coefficient ($\times 10^6$) of material of the third lens (L3) at temperatures within a range of 40° C. through 60° C., and dnN/dt (N) is refractive index temperature coefficient ($\times 10^6$) of material of the first lens (L1) at temperatures within a range of 40° C. through 60° C. (Examples 1 through 5, and 7).

Aspect 13

A camera 114 includes the imaging lens IL according any of Aspects 1 through 12. The imaging lens IL is an image-capturing optical system (Examples 1 through 7, FIGS. 15 and 16).

Aspect 14

A vehicle-mounted camera 14A includes the imaging lens IL according any of Aspects 1 through 12. The imaging lens IL is an image-capturing optical system (Examples 1 through 7, FIGS. 17 and 18).

Aspect 15

A sensing device includes the imaging lens IL according to any of Aspects 1 through 12 as an image-capturing optical system of a camera function unit (Examples 1 through 7, FIGS. 17 and 18).

Aspect 16

A vehicle-mounted sensing device 140 includes the vehicle mounted camera 14A according to Aspect 14 (Examples 1 through 7, FIGS. 17 and 18).

The present disclosure is not limited to the details of the example embodiments described above, and various modifications and improvements are possible.

The advantageous effects described in the embodiments of the present disclosure are preferred effects provided by disclosure, and the preferred effects are just recited; therefore, advantageous effects of the present disclosure are not limited to the effects described in the embodiments.

It is to be noted that the camera device of the present disclosure is not limited to a digital camera. The imaging lens according to Examples 1 through 7 is applicable in a camera dedicated to imaging, such as a video camera mainly for shooting a moving image and a silver salt camera that utilizes a silver film, a monitoring camera, a vehicle-mounted drive recorder, a vehicle-mounted rear view camera, and a vehicle-mounted surrounding view camera. As described above, a plurality of imaging lenses can constitute a stereo camera and a compound-eye camera. In addition, the camera can be used as a camera function unit of various information devices (portable information terminal device) such as mobile phone and portable terminal device, so-called, a smart phone and a tablet.

The imaging lens of the present disclosure is available as an optical system for use in an optical sensor, or a projection system for use in an image projection apparatus.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An imaging lens comprising:
   a first lens group having a negative refractive power, disposed facing an object side;
   a second lens group having a positive refractive power, disposed facing an image side: and
   an aperture stop disposed between the first lens group and the second lens group,
   the first lens group including:
     a first lens that is a negative lens having a negative meniscus shape with a convex surface facing the object side, the convex surface facing the object side being an object-side surface of the first lens; and
     a second lens that is a negative lens having a negative meniscus shape with a convex surface facing the object side, the first lens and the second lens being sequentially disposed in that order from the object side to the image side,
   the second lens group including:
     a third lens that is a positive lens having a convex surface facing the image side;
     a fourth lens that is a positive lens having a biconvex shape;
     a fifth lens that is a negative lens having a biconcave shape; and
     a sixth lens that is a positive lens having an aspherical surface with a concave surface facing the image side near an optical axis and a convex surface facing the image side in a marginal area, the concave surface that faces the image side being an image-side surface of the sixth lens,
   the third lens, the fourth lens, the fifth lens, and the sixth lens being sequentially disposed in that order from the object side to the image side,
   wherein conditional formula (1) below is satisfied:

$$0.16<DL3/TL<0.32 \quad (1)$$

where
   DL3 is a center thickness of the third lens, and
   TL is a distance between the object-side surface of the first lens and the image-side surface of the sixth lens along the optical axis.

2. The imaging lens according to claim 1, wherein conditional formula (2) below is satisfied:

$$0.45<fL3\text{-}L4/f<0.80 \quad (2)$$

where
   f is a focal length of the imaging lens as a whole, and
   fL3–L4 is a combined focal length of the third lens and the fourth lens in the second lens group.

3. The imaging lens according to claim 1, wherein conditional formula (3) below is satisfied:

$$0.04<DL5\text{-}L6/TL<0.15 \quad (3)$$

where
   TL is the distance between the object-side surface of the first lens and the image-side surface of the sixth lens along the optical axis, and
   DL5–L6 is a distance between an image-side surface of the fifth lens and an object-side surface of the sixth lens along the optical axis.

4. The imaging lens according to claim 1,
   wherein conditional formula (4) below is satisfied:

$$-1.20<fL5/f<-0.55 \quad (4)$$

where
   fL5 is a focal length of the fifth lens, and f is a focal length of the imaging lens as a whole.

5. The imaging lens according to claim 1,
   wherein conditional formula (5) below is satisfied:

$$38<\nu 2G<55 \quad (5)$$

where
   ν2G is an average value of Abbe numbers of materials of the third lens, the fourth lens, the fifth lens, and the sixth lens of the second lens group.

6. The imaging lens according to claim 1,
   wherein conditional formula (6) below is satisfied:

$$-2.70<fL1/f<-1.50 \quad (6)$$

where
   fL1 is a focal length of the first lens, and
   f is a focal length of the imaging lens as a whole.

7. The imaging lens according to claim 1,
   wherein each of the second lens, the fourth lens, and the fifth lens has at least one aspherical surface.

8. The imaging lens according to claim 1,
   wherein the first lens and the third lens are made of glass, and
   wherein the second lens, the fourth lens, the fifth lens, and the sixth lens are made of resin.

9. The imaging lens according to claim 8,
   wherein conditional formula (7) below is satisfied:

$$0.90<fL3/fL4<1.60 \quad (7)$$

where
   fL3 is a focal length of the third lens, and
   fL4 is a focal length of the fourth lens.

10. The imaging lens according to claim 9,
    wherein conditional formula (8) below is satisfied:

$$1.05<fL3/f<1.60 \quad (8)$$

where
fL3 is the focal length of the third lens, and
f is a focal length of the imaging lens as a whole.

11. The imaging lens according to claim 9,
wherein conditional formula (9) below is satisfied:

$$1.70 < |fL4\text{-}L5\text{-}L6|/f < 3.10 \tag{9}$$

where
fL4–L5–L6 is a combined focal length of the fourth lens, the fifth lens, and the sixth lens.

12. The imaging lens according to claim 9,
wherein conditional formula (10) below is satisfied:

$$0 < dnP/dt(P) - dnN/dt(N) < 8.0 \tag{10}$$

where
dnP/dt (P) is a refractive index temperature coefficient ($\times 10^6$) of material of the third lens, at temperatures within a range of 40° C. through 60° C., and
dnN/dt (N) is a refractive index temperature coefficient ($\times 10^6$) of material of the first lens, at temperatures within a range of 40° C. through 60° C.

13. A camera comprising:
an image-capturing optical system that forms an image, the image-capturing optical system including:
the imaging lens according to claim 1, the imaging lens forming the image;
an image sensor to photoelectrically convert the image formed by the imaging lens into an electrical signal; and
an image processing device to convert the electrical signal into image data.

14. A vehicle-mounted camera comprising:
an image-capturing optical system that forms an image of a subject viewed from a vehicle, the image-capturing optical system including:
the imaging lens according to claim 1, the imaging lens forming the image;
an image sensor to photoelectrically convert the image formed by the imaging lens into an electrical signal; and
an image processing device to convert the electrical signal into image data.

15. A sensing device comprising:
the imaging lens according to claim 1;
an image sensor to photoelectrically convert an image formed by the imaging lens into an electrical signal;
an image processing device to convert the electrical signal into image data; and
a processing unit to obtain sensing information from the image data.

16. A vehicle-mounted sensing device comprising;
the imaging lens according to claim 1;
an image sensor to photoelectrically convert an image of a subject viewed from a vehicle, formed by the imaging lens, into an electrical signal;
an image processing device to convert the electrical signal into image data; and
a processing unit to obtain sensing information from the image data.

* * * * *